US008180105B2

(12) United States Patent
Cobb et al.

(10) Patent No.: US 8,180,105 B2
(45) Date of Patent: May 15, 2012

(54) CLASSIFIER ANOMALIES FOR OBSERVED BEHAVIORS IN A VIDEO SURVEILLANCE SYSTEM

(75) Inventors: Wesley Kenneth Cobb, The Woodlands, TX (US); David Friedlander, Houston, TX (US); Kishor Adinath Saitwal, Houston, TX (US); Ming-Jung Seow, Houston, TX (US); Gang Xu, Katy, TX (US)

(73) Assignee: Behavioral Recognition Systems, Inc., Houston, TX (US)

( * ) Notice: Subject to any disclaimer, the term of this patent is extended or adjusted under 35 U.S.C. 154(b) by 427 days.

(21) Appl. No.: 12/561,956

(22) Filed: Sep. 17, 2009

(65) Prior Publication Data

US 2011/0064267 A1    Mar. 17, 2011

(51) Int. Cl.
*G06K 9/00* (2006.01)
*G08G 5/00* (2006.01)

(52) U.S. Cl. .................. 382/103; 382/286; 340/948
(58) Field of Classification Search .................. 382/100, 382/103, 106, 107, 155, 162, 168, 173, 181, 382/193, 199, 209, 218, 219, 224, 232, 254, 382/274, 276, 282, 286–294, 305, 312; 340/573, 340/948; 707/791; 375/240.01
See application file for complete search history.

(56) References Cited

U.S. PATENT DOCUMENTS

| | | | |
|---|---|---|---|
| 4,679,077 A | 7/1987 | Yuasa et al. | |
| 5,113,507 A | 5/1992 | Jaeckel | |
| 5,748,775 A | 5/1998 | Tsuchikawa et al. | |
| 5,751,378 A | 5/1998 | Chen et al. | |
| 5,969,755 A | 10/1999 | Courtney | |
| 6,252,974 B1 | 6/2001 | Martens et al. | |
| 6,263,088 B1 | 7/2001 | Crabtree et al. | |
| 6,570,608 B1 | 5/2003 | Tserng | |
| 6,661,918 B1 * | 12/2003 | Gordon et al. | 382/173 |
| 6,674,877 B1 * | 1/2004 | Jojic et al. | 382/103 |
| 6,678,413 B1 * | 1/2004 | Liang et al. | 382/181 |
| 6,856,249 B2 * | 2/2005 | Strubbe et al. | 340/573.1 |
| 6,940,998 B2 * | 9/2005 | Garoutte | 382/103 |
| 7,076,102 B2 * | 7/2006 | Lin et al. | 382/218 |
| 7,136,525 B1 | 11/2006 | Toyama et al. | |
| 7,158,680 B2 | 1/2007 | Pace | |

(Continued)

FOREIGN PATENT DOCUMENTS

WO    2009049314 A2    4/2009

OTHER PUBLICATIONS

J. Connell et al., "Detection and Tracking in the IBM PeopleVision System," IEEE ICME, Jun. 2004: pp. 1-4, <http://www.research.ibm.com/peoplevision>.

(Continued)

*Primary Examiner* — Seyed Azarian
(74) *Attorney, Agent, or Firm* — Patterson & Sheridan, LLP

(57) ABSTRACT

Techniques are disclosed for a video surveillance system to learn to recognize complex behaviors by analyzing pixel data using alternating layers of clustering and sequencing. A combination of a self organizing map (SOM) and an adaptive resonance theory (ART) network may be used to identify a variety of different anomalous inputs at each cluster layer. As progressively higher layers of the cortex model component represent progressively higher levels of abstraction, anomalies occurring in the higher levels of the cortex model represent observations of behavioral anomalies corresponding to progressively complex patterns of behavior.

24 Claims, 10 Drawing Sheets

U.S. PATENT DOCUMENTS

| | | | |
|---|---|---|---|
| 7,200,266 | B2 | 4/2007 | Ozer et al. |
| 7,227,893 | B1 | 6/2007 | Srinivasa et al. |
| 7,436,887 | B2 * | 10/2008 | Yeredor et al. ............ 375/240.01 |
| 7,606,425 | B2 * | 10/2009 | Bazakos et al. ............... 382/224 |
| 7,825,954 | B2 | 11/2010 | Zhang et al. |
| 7,868,912 | B2 | 1/2011 | Venetianer et al. |
| 7,882,135 | B2 * | 2/2011 | Brunner et al. ............... 707/791 |
| 2003/0107650 | A1 | 6/2003 | Colmenarez et al. |
| 2004/0151342 | A1 | 8/2004 | Venetianer et al. |
| 2005/0001759 | A1 | 1/2005 | Khosla |
| 2005/0105765 | A1 | 5/2005 | Han et al. |
| 2005/0240629 | A1 | 10/2005 | Gu et al. |
| 2006/0018516 | A1 | 1/2006 | Masoud et al. |
| 2006/0165386 | A1 | 7/2006 | Garoutte |
| 2006/0190419 | A1 | 8/2006 | Bunn et al. |
| 2006/0222206 | A1 | 10/2006 | Garoutte |
| 2008/0002856 | A1 | 1/2008 | Ma et al. |
| 2008/0181453 | A1 | 7/2008 | Xu et al. |
| 2008/0181499 | A1 | 7/2008 | Yang et al. |
| 2008/0193010 | A1 | 8/2008 | Eaton et al. |
| 2008/0240496 | A1 | 10/2008 | Senior |
| 2008/0252723 | A1 | 10/2008 | Park |
| 2009/0022364 | A1 | 1/2009 | Swaminathan et al. |
| 2009/0067716 | A1 | 3/2009 | Brown et al. |
| 2009/0210367 | A1 | 8/2009 | Armstrong et al. |
| 2009/0297023 | A1 | 12/2009 | Lipton et al. |
| 2009/0324107 | A1 | 12/2009 | Walch |
| 2010/0063949 | A1 | 3/2010 | Eaton et al. |

OTHER PUBLICATIONS

Helmut Grabner et al., "On-line Boosting and Vision," IEEE Conference on Computer Vision and Pattern Recognition (CVPR), 2006, vol. 1: pp. 260-267.

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Apewokin et al. "Multimodal Mean Adaptive Backgrounding for Embedded Real-Time Video Surveillance," Jun. 2007, IEEE 6 pages. Minneapolis, MN US.

Elgammal et al. "Non-parametric Model for Background Substraction," Computer Vision Laboratory, University of Maryland; Jun. 2000; 17 pages, College Park, MD US.

Haritaogul et al. "W4: Real-Time Surveillance of People and Their Activities," IEEE Transactions on Pattern Analysis and Machine Intelligence, Aug. 2000; vol. 22, No. 8; pp. 809-830.

Ivanov et al. "Video Surveillance of Interactions," MIT Media Laboratory, Cambridge, MA, Jul. 1999; 8 pages, Fort Collins, CO US.

Chris Stauffer et al., "Adaptive background mixture models for real-time tracking," Proceedings IEEE Conference on Computer Vision and Pattern Recognition, 1999: pp. 246-252.

Pentti Kanerva "Sparse Distributed memory and Related Models," M.H. Hassoun, ed., Associative Neural Memories: Theory and Implementation, 1993, pp. 50-76. New York: Oxford University Press.

Senior et al. "Appearance Models for Occlusion Handling," IBM T.J. Watson Research Center, 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

* cited by examiner

CLASSIFIER ANOMALIES FOR OBSERVED BEHAVIORS IN A VIDEO SURVEILLANCE SYSTEM

BACKGROUND OF THE INVENTION

1. Field of the Invention

Embodiments of the invention provide techniques for analyzing a sequence of video frames. More specifically, embodiments of the invention provide a video surveillance system configured to learn to recognize complex behaviors by analyzing pixel data using alternating layers of clustering and sequencing. Such a system may learn, over time, to identify anomalous behaviors at progressively more complex levels of abstraction.

2. Description of the Related Art

Some currently available video surveillance systems provide simple object recognition capabilities. For example, a video surveillance system may be configured to distinguish between scene foreground (active elements) and scene background (static elements) depicted in a video stream. A group of pixels (referred to as a "blob") depicting scene foreground may be identified as an active agent in the scene. Once identified, a "blob" may be tracked from frame-to-frame, allowing the system to follow and observe the "blob" moving through the scene over time, e.g., a set of pixels depicting a person walking across the field of vision of a video surveillance camera may be identified and tracked from frame-to-frame.

Some such systems may also classify a blob as being a particular agent (e.g., a person or a vehicle) as well as determine when an object has engaged in certain predefined behaviors. For example, a system may be able to identify certain simple events: "vehicle stopped," or "person enters vehicle," etc. The analysis typically includes tracking an object, assigning an object type, and analyzing its position, direction, and velocity, etc., to recognize simple events such as stop, turn, start, etc. A limiting factor for these systems is that the objects and actions involved need to belong to a known, small set of types. The systems involved are usually trained on a set of examples and cannot recognize new behavior types when brought on-line. The actions or events are usually directly derived from the data of the tracked object. As a result, such systems have been unable to recognize higher-orders of behavior from the observations of basic or simple actions.

Some currently available systems employ statistical models such as Markov systems or Bayesian networks to analyze a scene depicted in a sequence of video frames. However, these systems have proven to be too slow for real-time use and/or require extensive hand design and parameter tuning. Thus, such systems must be carefully calibrated for a given scene, and as the scene changes, or as new or different behaviors evolve, the system needs be recalibrated. Further, given these limitations, current systems are unable to recognize unusual or unexpected behaviors; to work in a wide variety of real-life situations; or to adapt to a changing environment.

In other words, current video analysis systems rely on predefined objects and/or behaviors to evaluate a video sequence. And unless the underlying system includes a description for a particular object or behavior, the system is generally incapable of recognizing that behavior (via instances of the pattern describing the particular object or behavior). Thus, what is "normal" or "anomalous" is defined in advance and additional knowledge engineering or additional software products are required to recognize additional objects or behaviors. This results in video surveillance systems with recognition capabilities that are labor intensive and prohibitively costly to maintain or adapt for different specialized applications.

SUMMARY

Embodiments of the invention relate to techniques for analyzing a scene captured by a video camera or other recorded video. One embodiment provides a method for analyzing a sequence of video frames depicting a scene captured by a video camera. The method may generally include receiving a set of data inputs derived by a computer vision engine configured to analyze pixels depicting a plurality of foreground objects in the sequence of video frames and modeling behavior of the foreground objects in the scene by passing the received sensory data inputs to a first cluster layer of a plurality of layers. The plurality of layers alternate between cluster layers and sequence layers. And the cluster layers generate clusters of sequences and the sequence layers generate sequences of clusters. The method may further include evaluating one or more of the cluster layers to identify an occurrence of a behavioral anomaly based on an input to one of the cluster layers and publishing an alert message indicating the occurrence of the behavioral anomaly.

Another embodiment of the invention includes a computer-readable storage medium containing a program which, when executed by a processor, performs an operation for analyzing a sequence of video frames depicting a scene captured by a video camera. The operation itself may generally include receiving a set of data inputs derived by a computer vision engine configured to analyze pixels depicting a plurality of foreground objects in the sequence of video frames and modeling behavior of the foreground objects in the scene by passing the received sensory data inputs to a first cluster layer of a plurality of layers. The plurality of layers alternate between cluster layers and sequence layers. And the cluster layers generate clusters of sequences and the sequence layers generate sequences of clusters. The operation may further include evaluating one or more of the cluster layers to identify an occurrence of a behavioral anomaly based on an input to one of the cluster layers and publishing an alert message indicating the occurrence of the behavioral anomaly.

Still another embodiment of the invention includes a system having a video input source configured to provide a sequence of video frames, each depicting a scene, a processor, and a memory containing a program. The program, when executed on the processor, may be configured to perform an operation for analyzing the scene, as depicted by the sequence of video frames captured by the video input source. The operation itself may generally include receiving a set of data inputs derived by a computer vision engine configured to analyze pixels depicting a plurality of foreground objects in the sequence of video frames and modeling behavior of the foreground objects in the scene by passing the received sensory data inputs to a first cluster layer of a plurality of layers. The plurality of layers alternate between cluster layers and sequence layers. And the cluster layers generate clusters of sequences and the sequence layers generate sequences of clusters. The operation may further include evaluating one or more of the cluster layers to identify an occurrence of a behavioral anomaly based on an input to one of the cluster layers and publishing an alert message indicating the occurrence of the behavioral anomaly.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
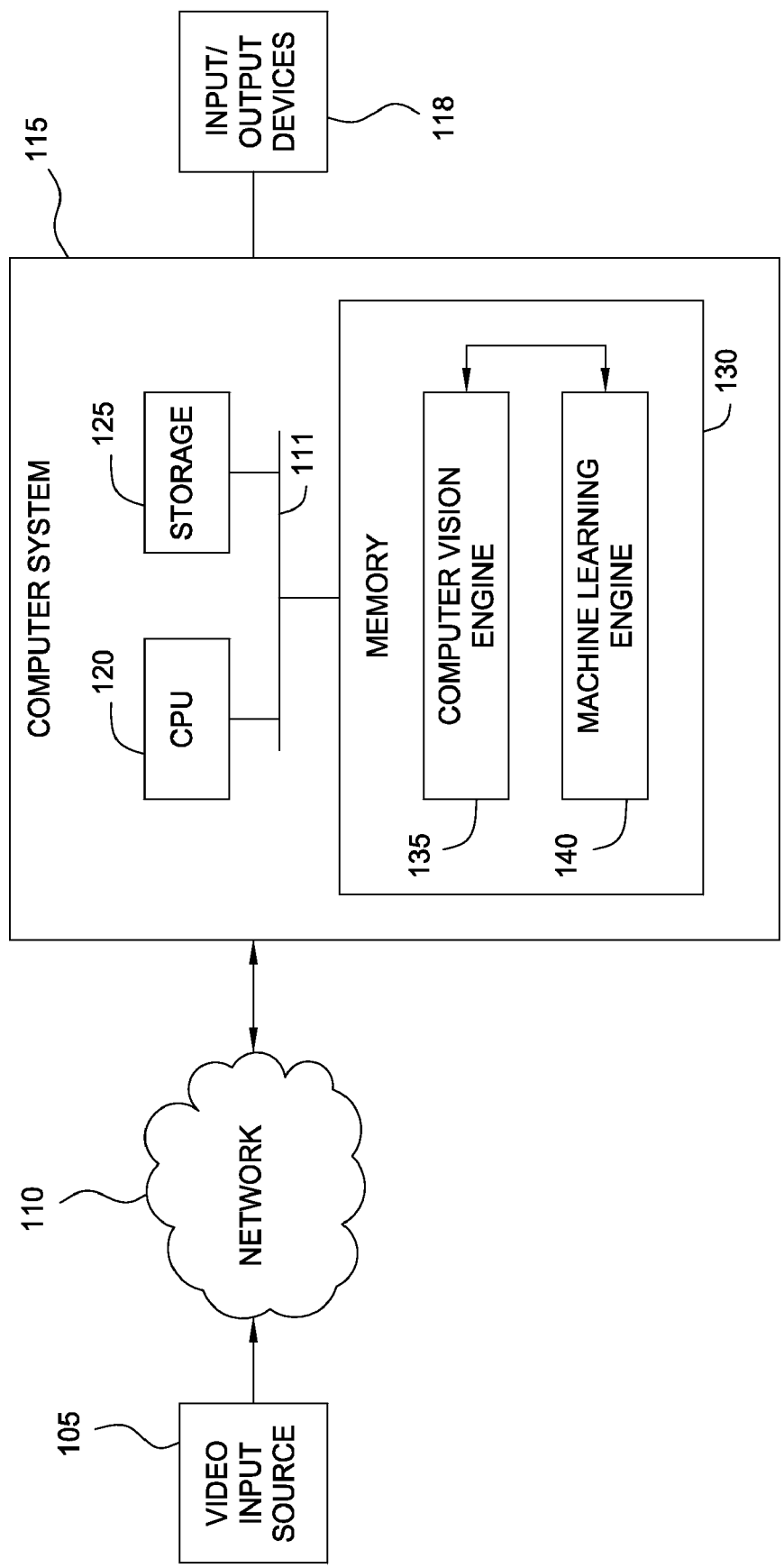
FIG. 1 illustrates components of a video surveillance system, according to one embodiment of the invention.

Embodiments of the invention relate to techniques for analyzing a scene captured by sensors or other recorded sensor data. One embodiment provides a computer-implemented method for analyzing video data. The computer implementation models certain aspects of the mammalian cerebral cortex. The sensory cortices are quite similar except for the first layer, which receives data directly from the specific sense organ. The lower layers of the cortex contain two sections, a dorsal section which determines what is being seen a ventral section which determines location and motion. The sensory data may be represented as feature vectors which are formed into clusters. These clusters form sequences, then clusters of sequences of clusters of feature vectors are formed, etc. Each level becomes more abstract and involves a larger amount of space and time. One embodiment of the invention uses self-organizing maps (SOMs) and adaptive resonance theory (ART) networks to form clusters, and the Voting Experts method to form sequences.

Thus, embodiments of the invention provide techniques for a video surveillance system to learn to recognize complex behaviors by analyzing pixel data using alternating layers of clustering and sequencing. One embodiment includes a video surveillance system configured to observe a scene (as depicted in a sequence of video frames) and, over time, develop hierarchies of concepts including classes of objects, actions and behaviors. That is, the video surveillance system may develop models at progressively more complex levels of abstraction used to identify what events and behaviors are common and which are unusual. When the models have matured, the video surveillance system issues alerts on unusual events. This may occur automatically, without user input and using any sensors that can track and classify objects.

In one embodiment, the video surveillance system may include a computer vision engine configured to generate a background model representing the background elements of a scene. The background model generally represents the static elements of a scene captured by a video camera. For example, consider a video camera trained on a stretch of highway. In such a case, the background would include the roadway surface, the medians, any guard rails or other safety devices, and traffic control devices, etc., visible to the camera. The background model may include an expected pixel color value for each pixel of the scene when the background is visible to the camera. Thus, the background model provides a rough image of the scene in which no activity is occurring (e.g., an empty roadway). Conversely, vehicles traveling on the roadway (and any other person or thing engaging in some activity) occlude the background when visible to the camera and represent scene foreground objects.

Once the background model has matured, the computer vision engine may compare the pixel values for subsequent frames with the background image and identify objects as they appear and move about the scene. Typically, when a region of pixels in the scene (referred to as a "blob" or "patch") is classified as depicting foreground, the patch itself is identified as a foreground object. Once identified, the computer vision engine may derive a broad variety of kinematic data while tracking the foreground object from frame-to-frame, e.g., position, current (and projected) direction, orientation, velocity, and acceleration of the object, as well as other information such as size, color shininess, rigidity, height/width in pixels, average color values, shape, area, etc. In one embodiment, information derived by the computer vision engine may be used to track the object from frame-to-frame.

The computer vision engine may output this information as a stream of "context events" derived for each foreground object detected in the video frames. The context events may specify both the kinematic data derived for a foreground object e.g., a spatial position, direction of movement, velocity and acceleration, etc. and data characterizing a variety of features of a foreground object, e.g., a shininess, rigidity, area, ratios of height to width, etc., (referred to herein as micro-features). In one embodiment, the computer vision engine may output the stream of context events related to each foreground object observed in the scene at a fixed rate (e.g., 5 Hz).

As described in greater detail herein, the context events (i.e., the kinematic data and the micro-feature data) output from the computer vision engine may be supplied to the machine-learning engine. In one embodiment, the machine learning engine includes a cortex model component configured to receive and analyze the context events output from the computer vision engine. The context events provide the cortex model component with data that can describe foreground object behavior for any given scene captured by a video camera: object, time, position, velocity, and primitive features. Further, like a mammalian visual cortex, the lower layers of the cortex model component may be divided into two sections, one for object identification and one for object location, referred to as the dorsal and ventral sections, respectively. The micro features are input to the first dorsal layer of the cortex model component and the kinematic data is input to the first ventral layer of the cortex model component. At higher levels, outputs form the dorsal and ventral sides are combined so that an entire behavior-space can be represented.

In one embodiment, the cortex model component uses alternating layers of clustering and sequencing to identify behaviors based on the numerical data derived from a sequence of video frames (i.e., from the kinematic data and micro features). In general, clusters in each cluster layer represent concepts and sequences in each sequence layer represent linguistic-like constructs or statements. Each layer of the cortex model component provides an additional degree of abstraction from the raw-sensor data (i.e., from the kinematic data and micro features). Thus, rather than attempt to identify complex patterns of behavior (whether normal or anomalous) from raw data directly, complex patterns of behavior may emerge in higher layers of the cortex model component.

In one embodiment, the cortex model component uses alternating layers of clustering and sequencing to identify behaviors based on the numerical data derived from video frames (i.e., from the kinematic data and/or micro features). In general, clusters in each cluster layer and sequences in each sequence layer represent linguistic-like concepts, behaviors or statements. Each higher layer of the cortex model component contains information from a larger amount of space and time because it uses data from more frames. Each higher layer also provides an additional degree of abstraction from the raw-sensor data (i.e., from the kinematic data and micro features). Thus, rather than attempt to identify complex patterns of behavior (whether normal or anomalous) from raw data directly, complex patterns of behavior emerge in higher layers of the cortex model component.

In addition to this bottom-up organization, which comes from sensory data and dominates the process of cluster and sequence selection, there is a top-down process, referred to as expectation maximization. A cluster may have a slight tendency to be assigned to the most likely sequence and a sequence will have a slight tendency to be assigned to the most likely cluster. This helps resolve ambiguity and improve stability.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, software routines composed to implement embodiments of the invention may be part of an operating system or a specific application, component, program, module, object, or sequence of instructions. Computer programs implementing embodiments of invention typically include a collection of source code files that may be compiled (or interpreted) into a machine-readable format and hence executable instructions. Additionally, multiple applications may interact with one another, e.g., a user-application program may interact with another application such as a database to provide an intended service or function. Also, such programs typically include variables and data structures that may reside in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates components of a video analysis and behavior-recognition system 100, according to one embodiment of the present invention. As shown, the behavior-recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, floppy disk drive, and the like), and a memory 130 containing both a computer vision engine 135 and a machine-learning engine 140. As described in greater detail below, the computer vision engine 135 and the machine-learning engine 140 may provide software applications configured to analyze a sequence of video frames provided by the video input 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known such formats e.g., MPEG2, MJPEG, MPEG4, H.263, H.264, and the like.

As noted above, the computer vision engine 135 may be configured to analyze this raw information to identify active objects in the video stream, classify the objects, derive a variety of data regarding the actions and interactions of such objects, and supply this information to a machine-learning engine 140. And in turn, the machine-learning engine 140 may be configured to evaluate, observe, learn and remember details regarding events (and types of events) that transpire within the scene over time.

In one embodiment, the machine-learning engine 140 receives the video frames and the data generated by the computer vision engine 135. The machine-learning engine 140 may be configured to analyze the received data, build semantic representations of events depicted in the video frames, detect patterns, and, ultimately, to learn from these observed patterns to identify normal and/or abnormal events. Additionally, data describing whether a normal/abnormal behavior/event has been determined and/or what such behavior/event is may be provided to output devices 118 to issue alerts, for example, an alert message presented on a GUI interface screen. In general, the computer vision engine 135 and the machine-learning engine 140 both process video data in real-time. However, time scales for processing information by the computer vision engine 135 and the machine-learning engine 140 may differ. For example, in one embodiment, the computer vision engine 135 processes the received video data frame-by-frame, while the machine-learning engine 140 processes data every N-frames. In other words, while the computer vision engine 135 analyzes each frame in real-time to derive a set of information about what is occurring within a given frame, the machine-learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine-learning engine 140 for analysis. Similarly, the output from the computer vision engine 135 and machine-learning engine 140 may be supplied over computer network 110 to other computer systems. For example, the computer vision engine 135 and machine-learning engine 140 may be installed on a server system and configured to process video from multiple input sources (i.e., from multiple cameras). In such a case, a client application 250 running on another computer system may request (or receive) the results of over network 110.

Figure 2:
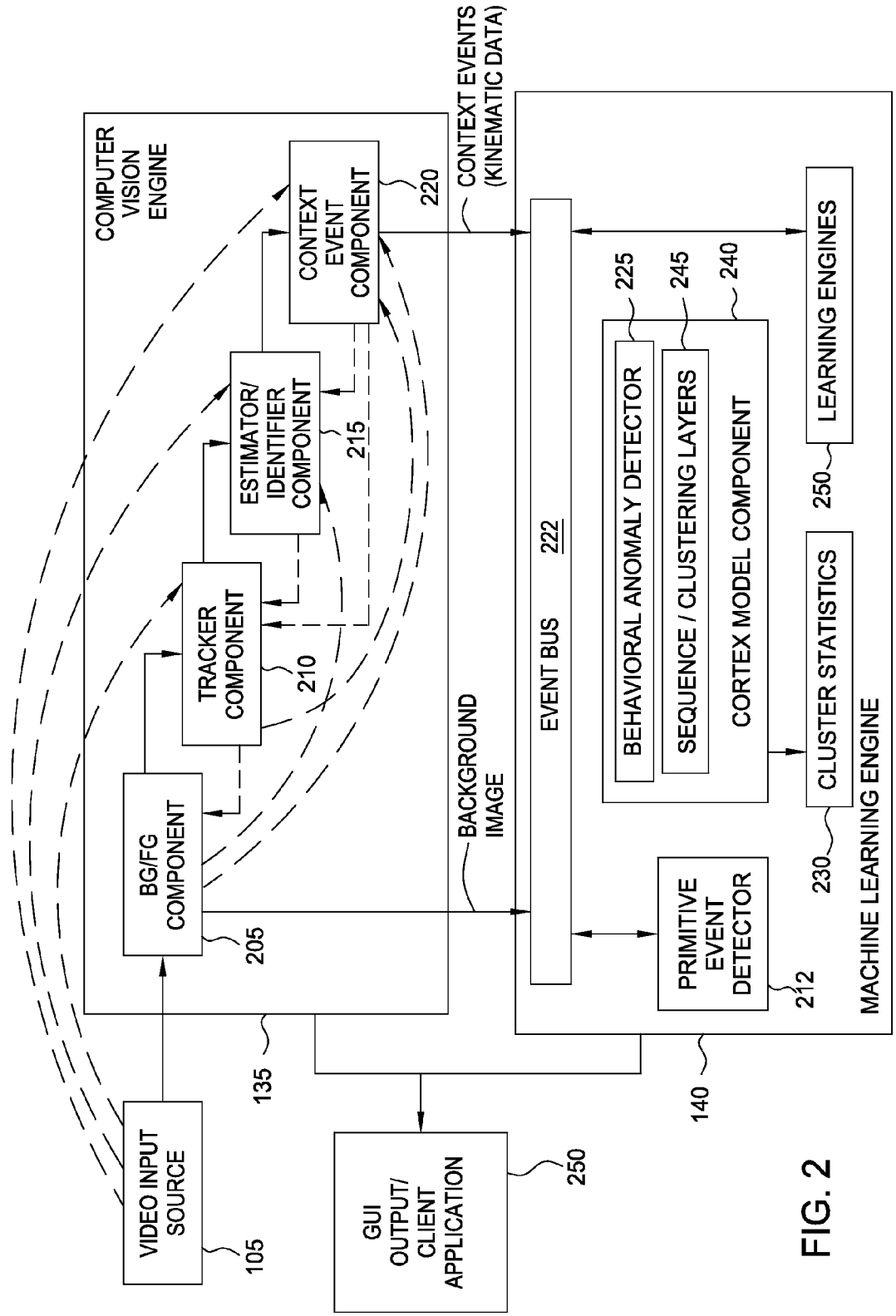
FIG. 2 further illustrates components of the video surveillance system shown in FIG. 1, according to one embodiment of the invention.

FIG. 2 further illustrates components of the computer vision engine 135 and the machine-learning engine 140 first illustrated in FIG. 1, according to one embodiment of the invention. As shown, the computer vision engine 135 includes a background/foreground (BG/FG) component 205, a tracker component 210, an estimator/identifier component 215, and a context event component 220. Collectively, the components 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows) as well as to the machine-learning engine 140. In one embodiment, the components 205, 210, 215, and 220 may each provide a software module configured to provide the functions described herein. Of course one of ordinary skill in the art will recognize that the components 205, 210, 215, and 220 may be combined (or further subdivided) to suit the needs of a particular case and further that additional components may be added (or some may be removed) from a video surveillance system.

In one embodiment, the BG/FG component 205 may be configured to separate each frame of video provided by the video input source 105 into a stationary or static part (the scene background) and a collection of volatile parts (the scene foreground). The frame itself may include a two-dimensional array of pixel values for multiple channels (e.g., RGB channels for color video or grayscale channel or radiance channel for black and white video). In one embodiment, the BG/FG component 205 may model background states for each pixel using an adaptive resonance theory (ART) network. That is, each pixel may be classified as depicting scene foreground or scene background using an ART network modeling a given pixel. In such a case, mature clusters in the ART network modeling a given pixel are presumed to model a background state and pixel color values in an input frame mapping to a mature cluster are presumed to depict scene background in that frame, where pixels mapping to an immature cluster (or to a new cluster) are presumed to depict an element of a foreground object (or an emergent background state). Of course, other approaches to distinguish between scene foreground and background may be used.

Additionally, the BG/FG component 205 may be configured to generate a mask used to identify which pixels of the scene are classified as depicting foreground and, conversely, which pixels are classified as depicting scene background. The BG/FG component 205 then identifies (contiguous) regions of the scene that contain a portion of scene foreground (referred to as a foreground "blob" or "patch") and supplies this information to subsequent stages of the pipeline.

The tracker component 210 may receive the foreground patches produced by the BG/FG component 205 and generate computational models for the patches. The tracker component 210 may be configured to use this information, and each successive frame of raw-video, to attempt to track the motion of an object depicted by a given foreground patch as it moves about the scene. That is, the tracker component 210 provides continuity to other elements of the system by tracking a given object from frame-to-frame.

The estimator/identifier component 215 may receive the output of the tracker component 210 (and the BG/FG component 205) and derive feature data for each tracked foreground object. For example, the estimator/identifier component 215 may derive a variety of micro features characterizing different aspects of a tracked foreground object, e.g., size, height, width, and area (in pixels), reflectivity, shininess rigidity, etc. Each micro feature may be represented using numerical values, e.g., a normalized value between 0 and 1 or a −1 representing a null value for a given micro feature. Additionally, the estimator/identifier component 215 may derive kinematic data describing the actions of a foreground object, e.g., a spatial position, direction of movement, velocity and acceleration, etc. Like the micro features, the kinematic data may be represented using numerical values.

The estimator/identifier component 215 may also include a trained classifier trained using a collection of training examples (positive and/or negative). Once trained, the classifier may be used to assign one of a set of pre-defined classifications (based on the training examples) to a tracked object, e.g., to classify a foreground object as being a "person," a "vehicle," an "unknown," or an "other." In this context, the classification of "other" represents an affirmative assertion that the object is neither a "person" nor a "vehicle."

The context event component 220 may receive the output from other stages of the pipeline (i.e., the tracked objects, the background and foreground models, and the results of the estimator/identifier component 215). In one embodiment, the context event component 220 may generate a stream of context events regarding objects tracked (by tracker component 210) and evaluated (by estimator identifier component 215). For example, the context event component 220 may package the numerical data as a stream of micro feature vectors and kinematic data vectors derived for a foreground object and output this to the machine-learning engine 140, e.g., a rate of 5 Hz. In one embodiment, the context events are packaged as being part of a trajectory associated with a given foreground object. As used herein, a trajectory generally refers to a list of vectors packaging the kinematic data vectors (or micro feature vectors) of a particular foreground object in successive frames or samples. Each element in the trajectory represents the kinematic data captured for that object at a particular point in time. Typically, a complete trajectory includes the kinematic data obtained when an object is first observed in a frame of video along with each successive observation of that object up to when it leaves the scene (or becomes stationary to the point of becoming part of the scene background). Accordingly, assuming computer vision engine 135 is operating at a rate of 5 Hz, a trajectory for an object is updated every 200 milliseconds, until complete.

The computer vision engine 135 may take the output from the components 205, 210, 215, and 220 describing the observations of motions and actions of the tracked objects in the scene and this information to the machine-learning engine 140. As shown, the machine-learning engine 140 includes a primitive event detector 212, a behavioral anomaly detector 225, cluster statistics 230, a cortex model component 240, which itself includes clustering/sequencing layers 245, and learning engines 250. Additionally, the machine-learning engine 140 includes a client application 250, allowing users to interact with the video surveillance system 100 using a graphical user interface.

The machine-learning engine 140 also includes an event bus 222. In one embodiment, the components of the computer vision engine 135 and machine-learning engine 140 output data to the event bus 222. At the same time, the components of the machine-learning engine 140 may subscribe to receive different events streams from the event bus 222. For example, the cortex model component 240 may subscribe to receive the kinematic data vectors and micro feature vectors output from the computer vision engine 135 and use this information to construct progressively complex abstractions representing behavioral patterns.

In one embodiment, the primitive event detector 212 may be configured to receive the output of the computer vision engine 135 (i.e., the video images, context event stream) and generate a sequence of primitive events—labeling the observed actions or behaviors in the video with semantic meaning. For example, assume the computer vision engine 135 has identified a foreground object and classified that foreground object as being a vehicle and the context event component 220 estimates the kinematic data regarding the car's position and velocity. In such a case, this information is supplied to the machine learning engine 140 and the primitive event detector 212. In turn, the primitive event detector 212 may generate a semantic symbol stream corresponding to a simple linguistic description of actions engaged in by the vehicle. For example, a sequence of primitive events related to observations of the computer vision engine 135 occurring at a parking lot could result in the following trajectory sequences: a first trajectory where the car appears as follows: "vehicle appears," "vehicle moves," "vehicle stops." A second trajectory could then be generated as: "person appears," "person moves," "person disappears from scene." And a third trajectory of "person appears," "person moves towards vehicle," "person stops," and "person disappears." At this point, the trajectory for the vehicle could continue as "vehicle starts moving," and "vehicle disappears." As described in greater detail below, in one embodiment, the trajectories of primitive event streams for a given foreground object (e.g., the car or the person) may be input to the first layer of the cortex model component 240.

Illustratively, the cortex model component 240 includes sequencing/clustering layers 245. As noted, the sequencing/clustering layers 245 in the cortex model component 240 alternate between clustering and sequencing. For example, in one embodiment, a first layer contains clusters of features (e.g., kinematic data vectors output by the computer vision engine clustered using an adaptive resonance theory (ART) network). A second layer contains sequences of clusters of features (e.g., sequences of ART network labels to which successive kinematic data vectors are mapped to), and a third layer contains clusters of sequences of clusters of features, etc. In this manner, lower level concepts, which are learned over smaller space and time scales, are stored in the lower levels of the cortex model component 240, and higher level concepts, which are learned over larger space and time scales, are stored in the higher levels. This approach allows the video surveillance system to distinguish unusual events from noise, particularly at higher layers of the cortex model component 240. Aspects of the clusters generated by the clustering layers of the cortex model component 240 and the sequences generated by the sequencing layers of the cortex model component 240 are described in greater detail below in conjunction with FIGS. 3-10.

In one embodiment, once sequencing/clustering layers 245 in the cortex model have observed the scene for a specified period of time, the behavioral anomaly detector 225 may use the current clusters (or sequences) to evaluate input from the computer vision engine 135, generally in real-time. That is, as the computer vision engine 135 builds a trajectory of kinematic data, micro feature data or primitive event data while observing a foreground object in the scene, the behavioral anomaly detector 225 may evaluate the emergent trajectories to identify anomalous events, based on the prior observations of the scene as represented by the then existing state of the sequencing/clustering layers 245. For example, if a current input (e.g., a kinematic data vector) does not map to an ART network cluster with a probability of mapped to that is above a specified threshold, relative to the input data being mapped to other clusters in that ART network, a cluster anomaly may be issued. Similarly, for sequence layers, if the current input (e.g., a cluster label assigned to a cluster in an ART network) is not an element of a sequence having a probability of occurring above a specified threshold (relative to prior observation), a sequence anomaly may be issued. More simply, as clusters and sequences modeling a given environment emerge in the clustering/sequencing layers 245 (i.e., clusters and sequences modeling the behavior of foreground objects in a scene captured in a sequence of video frames), the behavioral anomaly detector 225 may be configured to generate and issue alerts when input data received from the computer vision engine differs from prior observation. In one embodiment, probabilities of observing a given sequence or input data mapping to a given cluster may be stored by the cluster statistics 230.

Learning engines 250 represent additional engines (e.g., software modules or components) configured to evaluate data derived from the computer vision engine 135 (or components of the machine-learning engine 140). For example, in addition to the cortex model competent 240, the machine-learning engine 140 may include support vector machines, Markov models, sparse distributed memory structures, neural networks and other components configured to observe and model a scene captured by video input source 105.

Figure 3:
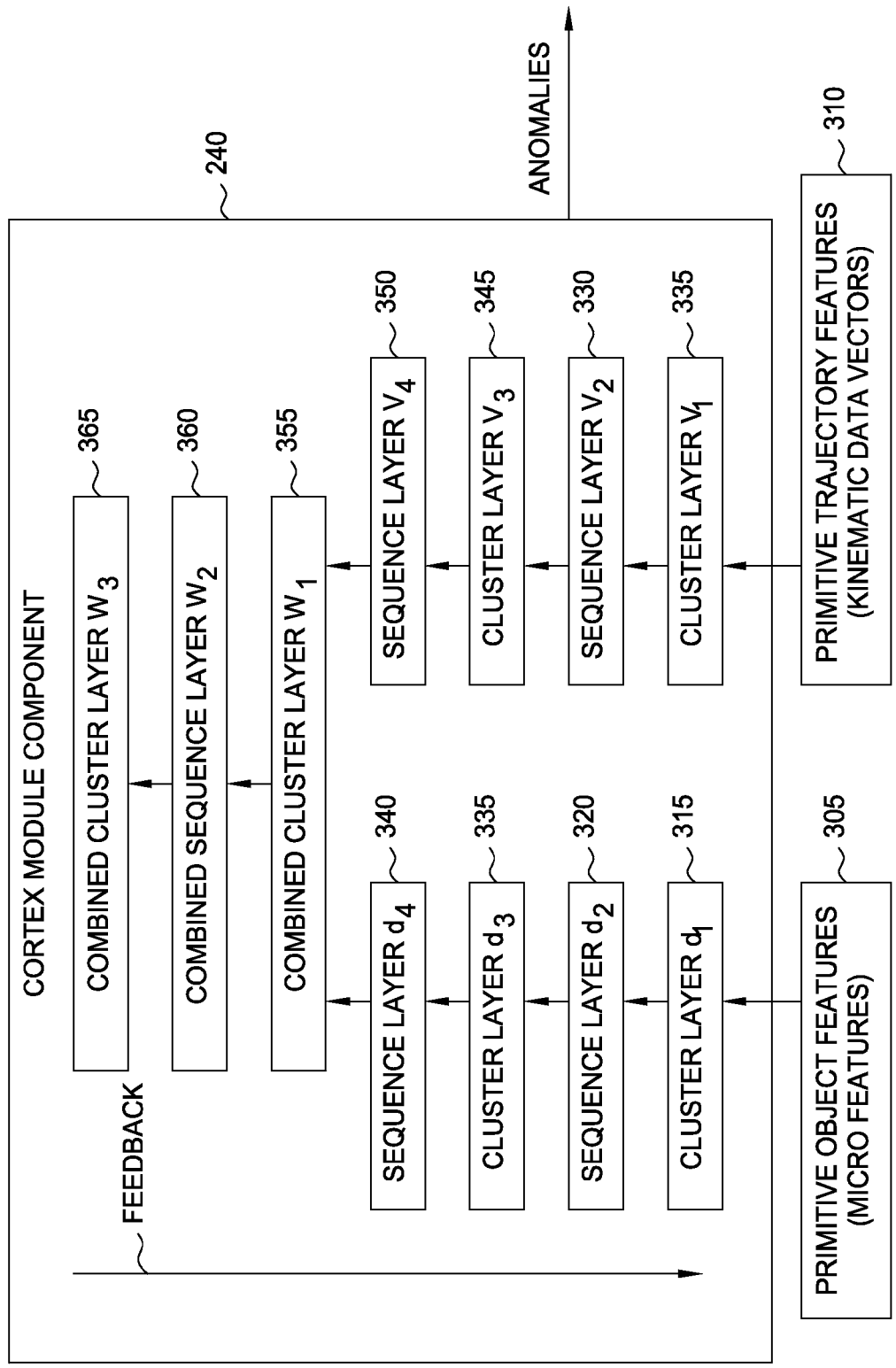
FIG. 3 further illustrates a cortex model component first shown in FIG. 2, according to one embodiment of the invention.

FIG. 3 further illustrates the cortex model component 240, according to one embodiment of the invention. As shown, the cortex model component 240 includes multiple layers—alternating between clustering layers and sequencing layers. Further, the first two layers of the cortex model are split between a dorsal side which includes a cluster layer $d_1$ 315, a sequence layer $d_2$ 320, a cluster layer $d_3$ 335, and a sequence layer $d_4$ 340; and a ventral side, which includes a cluster layer $v_1$ 325, a sequence layer $v_2$ 330, a cluster layer $v_3$ 345, and a sequence layer $v_4$ 350.

At a combined cluster layer $w_1$ 355, the output of a sequence layer $d_4$ 340 (i.e., a dorsal layer) is combined with the output of a sequence layer $v_4$ 350 (i.e., a ventral layer). Thereafter, the cortex model component 240 includes a set of alternating clustering and sequence layers $w_{2-3}$ 360 and 365. Of course, the cortex model component 240 may include more (or fewer) layers than shown in FIG. 3. Further, the cortex model component 240 may include more (or fewer) dorsal and ventral layers, and the number of dorsal and ventral layers need not be equal to one another. For example, the output of sequence layer $d_2$ 320 may be supplied directly to combined cluster layer $w_1$ 355. In such a case cluster layer $d_3$ 335 and sequence layer $d_4$ 340 could be omitted.

As shown, each successive layer in the cortex model component 240 collects data from the layer below, except for the cluster layer $d_1$ 315 (i.e., the first clustering layer in the dorsal side) and the cluster layer $v_1$ 325 (i.e. the first clustering layer in the ventral side). Illustratively, a cluster layer $d_1$ 315 receives primitive object features 305, i.e., trajectories which include micro feature vectors of a foreground object, and a cluster layer $v_1$ 325 receives primitive trajectory features, i.e., trajectories which include kinematic data vectors. When a specified number of trajectories have been collected at a given level of the sequencing/clustering layers 245, the clusters or sequences at that layer may be updated. In one embodiment, the cluster layer $d_1$ 315 and the cluster layer $v_1$ 325 each update using batches of one-hundred trajectories. Of course, the amount may be set to suit the needs of a particular case.

In one embodiment, the first dorsal and ventral cluster layers of the cortex model receive the micro feature data and kinematic data, respectively. That is, these layers cluster the numerical data like that just described for the kinematic data vectors received from the computer vision engine 135, while higher layers of the cortex model operate on symbolic data generated by the first sequence layer. As described in greater detail below, in one embodiment, each cluster layer includes a self-organizing map (SOM) and an adaptive resonance theory (ART) network used to cluster sequences of input data at that layer of the cortex model component 240. And each sequence layer includes a voting experts component configured to generate sequences from clusters input to that layer of the cortex model component 240. Thus, the clustering layers generate clusters of sequences and the sequencing layers generate sequences of clusters.

In one embodiment, the input data for the first dorsal layer are a time series of feature vectors derived from the object's trajectory, i.e., the collection of micro feature vectors. For example, as noted above, the estimator/identifier component 215 of the computer vision engine 135 may derive a variety of micro features characterizing different aspects of a foreground object, e.g., size, height, width, and area (in pixels), reflectivity, shininess rigidity, speed velocity, etc. In such a case, the resulting micro features may be packed as an object trajectory and passed to the cluster layer $d_1$ 315. In response, the cluster layer $d_1$ 315 may be configured to cluster different foreground objects as being instances of a common object type, based on the similarity of one objects' micro features to others. This approach allows distinct object types to emerge from the clustering of micro features (e.g., using an ART network to cluster the micro features). For example, the micro features of multiple passenger cars may all map to a common cluster in an ART network at the cluster layer $d_1$ 315, and therefore, be presumed as being instances of a common agent type. In such a case, the cluster layer $d_1$ 315 does not classify an observed vehicle as being a "passenger car" directly, but instead, as being an instance of an arbitrary object type having micro features similar to other passenger cars observed by the computer vision engine 135. At higher layers of the cortex model component 240 progressively more complex abstractions may emerge. For example, while distinct ART network clusters may emerge in the cluster layer $d_1$ 315 for observed micro features of passenger cars, motorcycles, and bicycles, at a higher level of abstraction, a cluster may emerge representing a more abstract concept, e.g., "vehicles."

On the ventral side, the cluster layer $v_1$ 325, the features 310 are kinematic variables of the trajectory of an observed foreground object including, but not limited to time, position, velocity, and acceleration. Alternatively (or additionally) the features passed to the cluster layer $v_1$ 235 may include a trajectory of primitive events generated by the primitive event detector 212, but not limited to: stop, start, turn, appear, disappear etc.

In one embodiment, layers in the context model component 240 may be configured to provide feedback to the layer below it. For example, suppose cluster layer $w_i$ has an element that is between $c_{i1}$ and $c_{i2}$, but a bit closer to $c_{i2}$. However sequence layer $w_{i+1}$ is building sequence $c_{ij} c_{ik} \ldots$ and the sequence $c_{ij} c_{ik} c_{i1}$ is much more probable than $c_{ij} c_{ik} c_{i2}$. In such a case, layer $w_{i+1}$ may provide enough feedback to layer $w_i$ so that the element in question would be assigned to cluster $c_{i1}$ rather than $c_{i2}$. Thus, the "expectations" of a sequencing layer may influence the clustering of inputs performed by the layer below it. Additionally, as the sequences and clusters mature in the sequence layers and cluster layers, anomalies may be generated when input data does not match well with a mature model of behavior at a given layer in the cortex model component 240.

Figure 4:
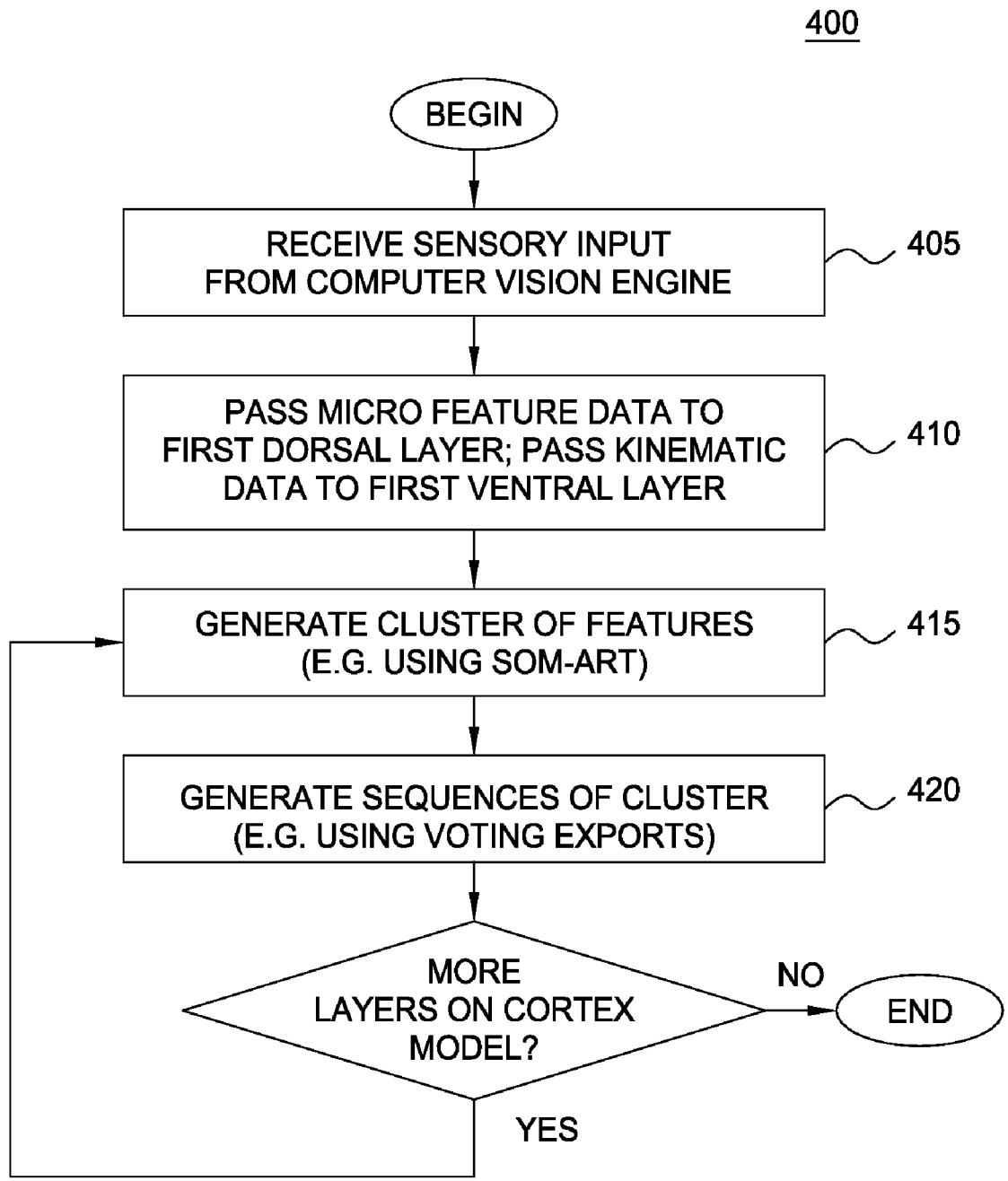
FIG. 4 illustrates a method for the cortex model component of FIG. 2 to evaluate a sequence of video frames using alternating cluster and sequence layers, according to one embodiment of the invention.

FIG. 4 illustrates a method 400 for the cortex model component 240 of FIG. 2 to evaluate a sequence of video frames using alternating clustering and sequencing layers, according to one embodiment of the invention. As shown, the method 400 begins at step 405 where the lowest layer of the cortex model component 240 receives sensory input data from the computer vision engine. For example, as described above, the computer vision engine 105 may supply a stream of context events which include both the micro feature data and the kinematic data derived for each foreground object in a scene (at a rate of 5 Hz).

At step 410, as the context events are received, the micro feature data may be passed to a first dorsal layer of the cortex model component 240, and the kinematic data may be passed to the first ventral layer of the cortex model component 240. At step 415, the respective dorsal and ventral cluster layers receiving the input data generate clusters of features from the input data. For example, the cluster layer may map the input data to a cluster in an adaptive resonance theory (ART) network. That is, the ART network is used to generate clusters modeling the input data. Once the clusters have matured, e.g., after a specified period of time or after clustering a specified minimum number of input data values, new input data values are mapped to clusters in the ART network. In such a case, the output of that cluster layer may be a sequence of labels assigned to the particular ART network clusters to which successive inputs data are mapped. Next, at step 420, the sequence layer receiving input data from the lower cluster layer may generate sequences of clusters. For example, the sequence layer may use a voting experts component to subdivide a sequence of ART network labels received from the clustering layer into one or more segments. In such a case, the output of that sequencing layer is the segments induced by the voting experts in the sequence of ART network labels received from the clustering layer. At step 425, if more layers remain in the cortex model component 240, then the process may be repeated using the segments identified by the sequencing layer. That is, the segments identified by the sequencing layer are clustered using an ART network in the next cluster layer.

Figure 5:
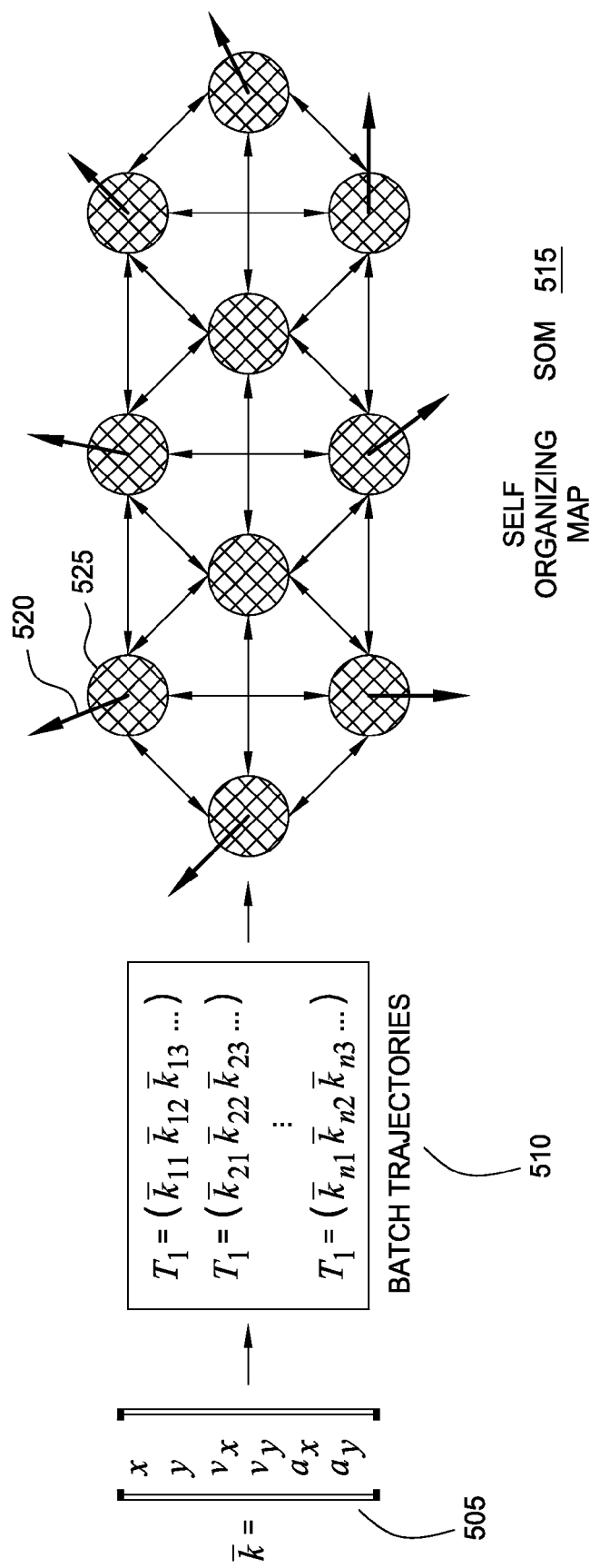
FIG. 5 illustrates sensory data passed to a first cluster layer of the cortex model component of FIG. 2, according to one embodiment of the invention.

FIG. 5 illustrates sensory data passed to a first cluster layer of the cortex model component 240 of FIG. 2, according to one embodiment of the invention. In particular, FIG. 5 illustrates data used to train an ART network in a first cluster layer of the cortex model using a self organizing map (SOM) 515. Illustratively, the kinematic data vectors (k) derived for foreground objects in a sequence of video frames are batched into a set of trajectories $T_{1-n}$ 510—one trajectory (T) for each foreground object. In one embodiment, the cluster layer batches trajectories (T) for n objects (e.g., 100 foreground objects) and then using the list of kinematic vectors for those objects trains the SOM 515. Further, the cluster layer may use a fixed number of kinematic vectors from each trajectory (T) to train the SOM 515. For example, the cluster layer may select 10 equally spaced kinematic vectors from each trajectory T. Thus, for a trajectory of 1500 kinematic vectors (representing a foreground object present in the scene for five minutes, sampled at a rate of 5 hz), the kinematic vectors corresponding to the $1^{st}$, $150^{th}$, $300^{th}$ ... $1500^{th}$ ones in the trajectory for this foreground object may be used to train the SOM 515.

In this example, a kinematic vector (k) 505 includes six components $\langle x, y, v_x, v_y, a_x, a_y \rangle$ representing the spatial position of an object (x, y) the velocity $(v_x, v_y)$ and acceleration $(a_x, a_y)$ of the object in a sequence of video frames. In one embodiment, the (x, y) components may be defined as follows:

$$x = \tilde{x} + \frac{w}{2}, y = \tilde{y} + \frac{w}{2}$$

where $\tilde{x}$ and $\tilde{y}$ are the kinematic coordinates, the point in a frame corresponding to the upper left hand corner of an image bounding box around a foreground object. And the velocity $(v_x, v_y)$ components may be defined as follows:

$$v_x = \frac{\tilde{v}_x}{w}, v_y = \frac{\tilde{v}_y}{h}$$

where $\tilde{v}_x$ and $\tilde{v}_y$ are the kinematic velocity components, and h and w are the height and width of the image bounding box, respectively. And the acceleration $(a_x, a_y)$ components may be defined as follows:

$$a_x = \frac{\tilde{a}_x}{w}, a_y = \frac{\tilde{a}_y}{h}$$

where $\tilde{a}_x$ and $\tilde{a}_y$ are the kinematic components acceleration. Once n trajectories (T) are available, the batched trajectories 510 are mapped to nodes in SOM 515. As is known, a self-organizing map (SOM) is an artificial neural network trained using unsupervised learning to produce a low-dimensional (typically two-dimensional) representation of the input space of the training samples, referred to as a map. The map may include fixed number of nodes, and a weight vector may represent each node. For example, node 525 of SOM 515 includes a vector 520 (represented as an arrow). Other nodes in SOM 515 are depicted similarly. Once trained, the weight vectors in each node of the SOM (e.g., vector 520) may be clustered using an adaptive resonance theory (ART) network.

Figure 6:
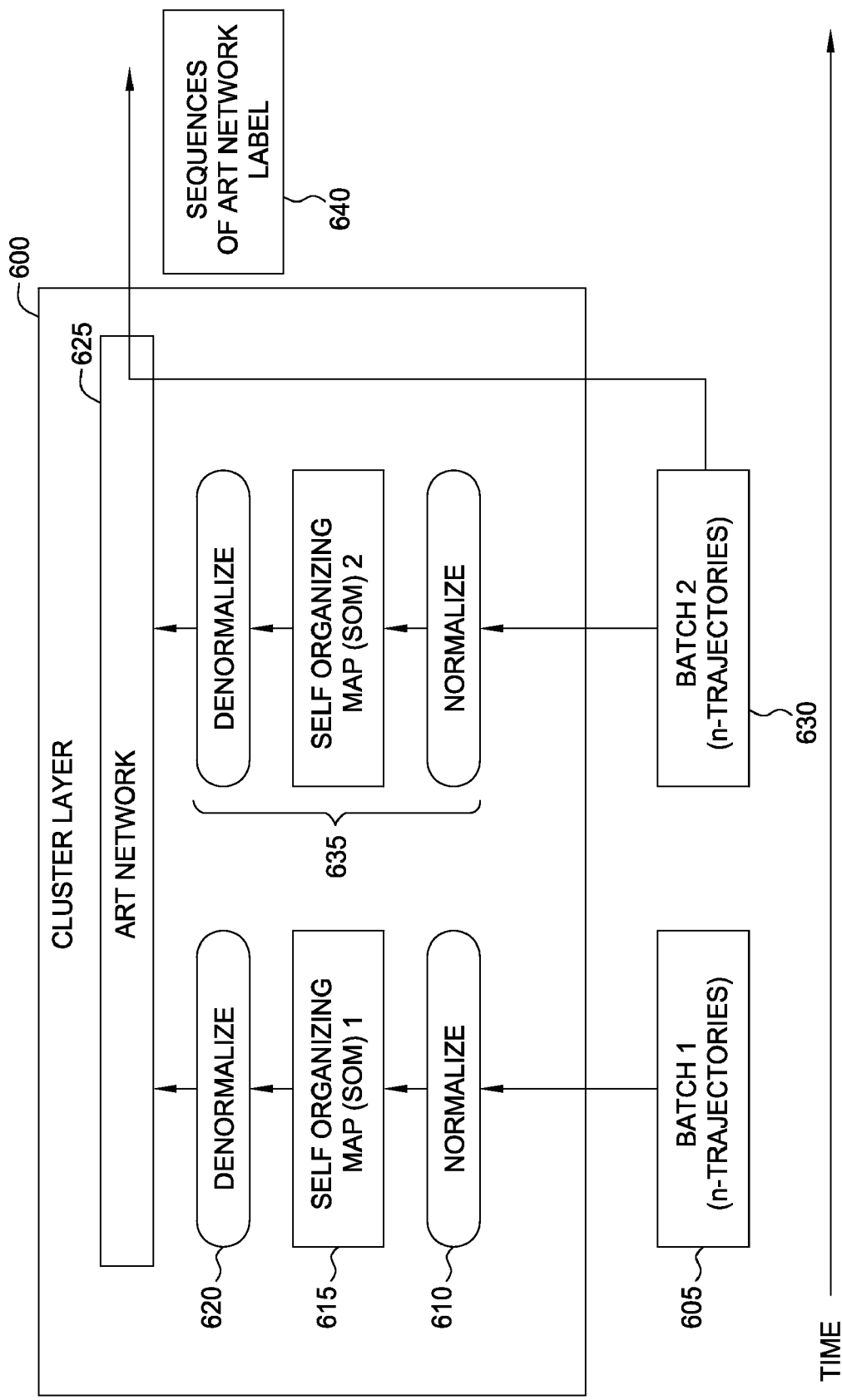
FIG. 6 illustrates a data flow for training a cluster layer in the cortex model component of FIG. 2, according to one embodiment of the invention.

For example, FIG. 6 illustrates a data flow for training a cluster layer 600 in the cortex model component 240 of FIG. 2, according to one embodiment of the invention. In this example, cluster layer 600 represents the first ventral layer of the cortex model component 240. Thus, cluster layer 600 receives the kinematic data vectors from the computer vision engine 135. As shown, a first batch of n trajectories 605 is normalized at 610 (e.g., such that the numerical data in each trajectory has a mean of 0 and a variance of 1). The normalized vectors are mapped to the nodes of a self organizing map SOM 1 615. At 620, the resulting node weight vectors in the nodes of SOM 1 are denormalized and provided as six-dimensional inputs to an ART network 625.

As is known, an ART network provides a specialized neural network configured to create clusters from vector inputs of N elements. For example, an ART network may receive a vector as input and either update an existing cluster or create a new cluster, as determined using a choice test and a vigilance test for the ART network. Each cluster itself may be characterized by a mean and a variance from a prototype input representing that cluster. The mean specifies a center location for the cluster (in an N-dimensional space for N elements) and the variance specifies a radius of the cluster. The prototype is generated first, as a copy of the input vector used to create a new cluster. Subsequently, the prototype may be updated as new inputs are mapped to that cluster.

As stated, inputs are mapped to clusters in an ART network using a choice test and a vigilance test. The choice and vigilance tests are used to evaluate the vector passed to the ART network and select what cluster to map the inputs to (or create a new cluster). The choice test generally provides a ranking of the existing clusters, relative to the vector input data. Once ranked, the vigilance test evaluates the existing clusters to determine whether to map the input to a given cluster. If no cluster is found to update using the data supplied to the input layer, evaluated sequentially using the ranked clusters, then a new cluster is created. That is, once a pattern is found (i.e., the input "matches" an existing cluster according to the choice and vigilance tests), the prototype for that cluster is updated based on the values of the input vector moving the cluster slightly towards the input pattern (in the N-dimensional space of the ART network). Otherwise, if the input vector does not match any available cluster (using the vigilance test), the ART network may create a new cluster by storing a new pattern similar to the input vector. Subsequent input vectors that most closely resemble the new cluster (relative to the others) are then used to update that cluster.

The vigilance parameter has considerable influence on an ART network: higher vigilance produces many, fine-grained clusters, while a lower vigilance results in more-general clusters. Further, the inputs may be binary values (generally referred to as an ART1 network), or may be continuous values (generally referred to as an ART2 network). Other variations of the ART network include ART3, ARTMAP, and FUZZY ART networks.

As stated, inputs mapping to an existing ART network cluster may be used to update a mean and variance for each dimension of the ART network, changing the position, shape and size of the cluster. Alternatively, the clusters may be defined using a mean and a covariance. Doing so results in a more accurate boundary for each cluster. However, using a covariance approach increases the computational complexity. Thus, the actual approach may be tailored to suit the needs of a particular case.

In context of the present invention, the ART network 625 may be trained using the denormalized weight vectors from SOM 1 615. Once trained, SOM 1 615 may be discarded. Thereafter, the cluster layer 600 may evaluate the trajectories of foreground objects in the scene using trained ART network 625. For example, each new kinematic data vector for a given foreground object in the scene may be passed to the ART network 625. In response, the ART network may specify a mapping to a "closest" cluster within ART network 625 for that input data vector (determined in the first cluster layers, e.g., using a Euclidian distance measure). If the distance between the input data and the closest cluster in the ART network 625 exceeds a specified amount, or if the closest cluster has not been reinforced a specified minimum number of times (i.e., the cluster is "immature"), an alert specifying the occurrence of an anomalous observation may be generated.

As a sequence of kinematic data vectors are mapped to ART network 625, a sequence of ART labels 640 is generated. In one embodiment, the sequence of ART labels 640 is passed to the sequence layer for segmentation by a voting experts component. Thus, the ART network 625 allows the cortex model component 240 to transition from numerical representation of observations (the kinematic data vectors) to a symbolic representation (the sequence of ART network labels).

At the same time, the cluster layer 600 continues to batch trajectories for foreground objects until another n trajectories are available, e.g., batch 2 630. At 635, the n trajectories in batch 2 630 may be normalized, passed to the nodes of a SOM 2 635, and denormalized in the same manner described for the kinematic data vectors in batch 1 605. Further, the denormalized node weight vectors in SOM 2 may be used to update the clusters in the ART network 625. Doing so allows the ART network 625 to further refine the clusters in that ART network as well as respond to changes in behavior occurring in the scene. That is, as new behaviors emerge in the scene, new clusters will emerge in the ART network 625. Further, over time, as the new clusters mature, the cluster layer 600 may treat input data mapping to such clusters as being representative of an observation of normal behavior. Thus, when input data (e.g., a kinematic data vectors) maps to a cluster in ART network 625 that has not matured—it may represent a new emergent behavior or the observation of an anomalous event (at that layer of the cortex model component 240). Accordingly, in one embodiment, the ART network 625 may issue an alert to users of the video surveillance system when such an event occurs.

The process of batching trajectories and refining the ART network 625 may be repeated indefinitely. In each iteration, a batch of kinematic data vectors (or micro-feature vectors) is mapped into a self organizing map (SOM) and the resulting nodes of the SOM are used to train (or update) clusters in the ART network 625. Further, once trained, the ART network 625 may be used to generate a sequence of ART network labels from observations of a foreground object in the scene. Such a sequence is passed to the next sequencing layer, which, in turn, creates segments of the ART network labels themselves clustered by an ART network in the next cluster layer, and the process repeats itself.

Figure 7:
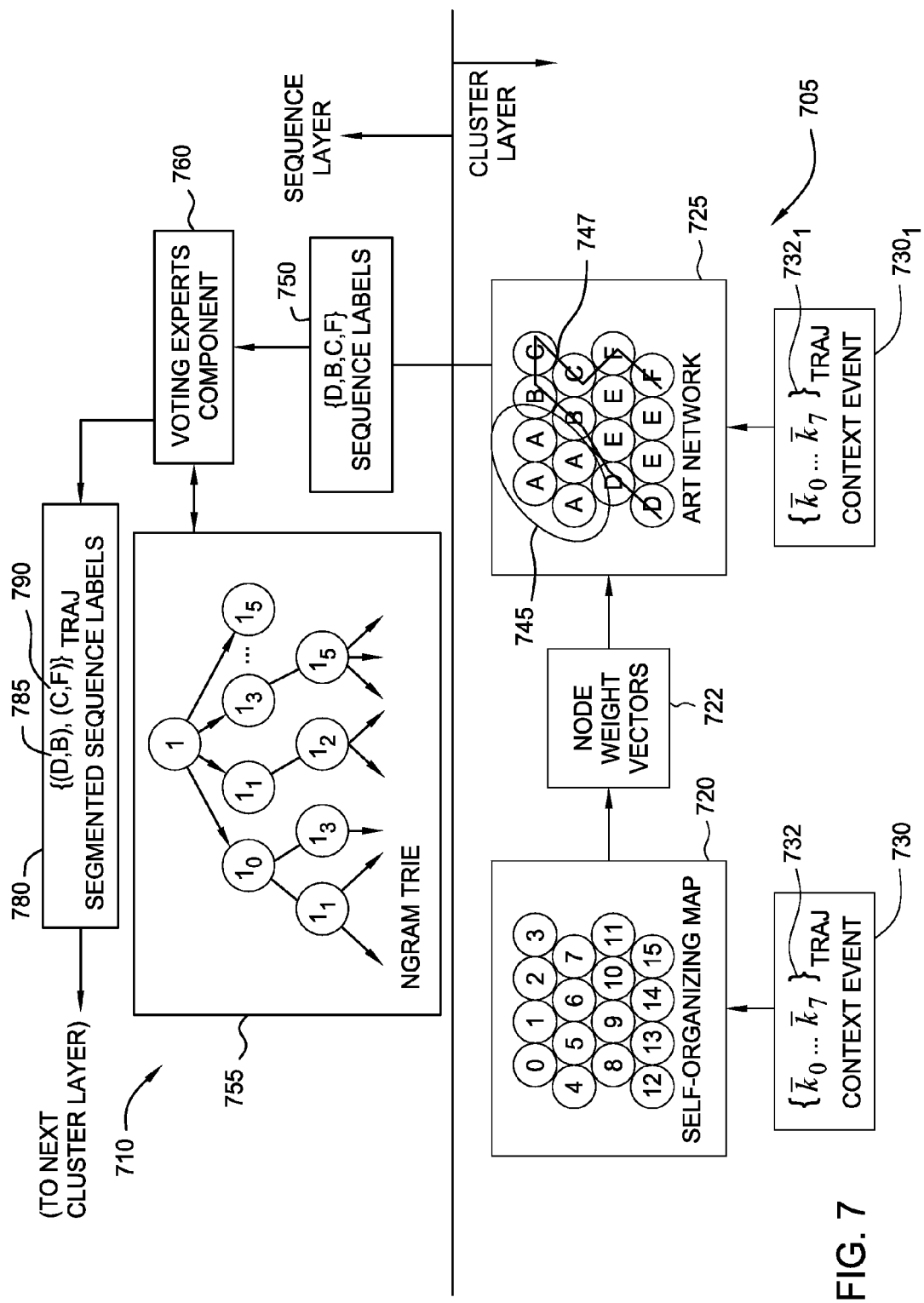
FIG. 7 illustrates a cluster layer and a sequence layer of the cortex model component of FIG. 2, according to one embodiment of the invention.

This result is shown in FIG. 7 which illustrates a cluster layer 705 and a sequence layer 710 of the cortex model component 240 of FIG. 2, according to one embodiment of the invention. As shown, the cluster layer 705 includes a self-organizing map (SOM) 720 and an ART network 725. The cluster layer 705 maps context events 730 to nodes of the SOM 720. Illustratively, the context event 730 includes a trajectory vector 732. And the trajectory vector 732 itself includes the kinematic data vectors $k_i$ for an object represented by the context event 730 (again, sampled at a 5 Hz rate). That is, each vector $k_i$ in the trajectory vector 732 stores the kinematic data derived for an object observed in the scene by the computer vision engine 135 at successive points in time.

As described above, the cluster layer 705 may be configured to map each element in a trajectory vector included in the context event 730 to a node in the SOM 720 and the resulting node weight vectors 722 in SOM 720 may be used to train the ART network 725. For example, as shown, the node weight vectors of nodes 0, 1, 4, and 5 in SOM 325 result in a cluster 745 (labeled as cluster "A") in the ART network 725 and nodes 9 and 12 result in another cluster (labeled as cluster "B" in the ART network 725).

Once the ART network 725 is trained using the SOM node weight vectors, the kinematic data vectors $k_i$ may be clustered using that ART network 725. FIG. 7 shows this as kinematic data vectors $k_i$ $732_1$ of context event $730_1$ being passed directly to the ART network 725. This results in a sequence of ART labels in the ART network 725. Specifically, the elements of $k_0, k_1, k_2, k_3, k_5, k_6, k_7$ in the trajectory vector $732_1$ are mapped to clusters labeled D, D, B, B, C, C, F, F, respectively. Note, the particular sequence at which nodes of the trajectory vector $732_1$ are mapped into the SOM 325 creates an ordered sequence 747. Removing redundant elements results in a sequence of {D, B, C, F}, shown in FIG. 7 as label sequence 750.

In one embodiment, the sequence layer 710 includes software modules configured to evaluate sequences generated by the cluster layer 705 (e.g., the label sequence 750). Illustratively, the sequence layer 710 includes an ngram trie 755 generated by a voting experts component 760. As is known, the voting experts method provides an unsupervised approach for identifying chunks in sequences (e.g., the label sequence 750) having low entropy within a chunk and high entropy between chunks. The voting experts component 760 evaluates the frequency of a given input sequence and the uncertainty of the symbol that follows a sequence. In particular, voting experts component 760 slides a window of length L across the label sequence 750 and votes to place boundaries in such a way as to maximize the frequency of the subsequences between the boundaries, and to maximize the uncertainty of the characters immediately after boundaries. Then the voting experts induce a segment in the symbol stream at locations that have a number of votes exceeding a minimum vote count M. That is, the voting experts method looks for two characteristics of chunks: the entropy or unpredictability of elements within a chunk is relatively low, whereas the entropy or unpredictability of elements between chunks is relatively high. By maximizing the frequencies of the segments in the input symbol stream, the voting experts method minimizes the unpredictability within a segment, and by maximizing the unpredictability of the symbols that follow a segment, voting experts seeks to maximize the unpredictability between segments.

In one embodiment, the voting experts component 760 may include an internal entropy expert and a boundary entropy expert to evaluate a sequence received from the cluster layer. In particular, the voting experts component 760 may segment the sequence of ART network labels in a given trajectory to maximize the entropy between two segments (as voted for by the boundary entropy expert) and minimize the internal entropy in each segment (as voted for by the internal entropy expert). Once segmented, the sequence layer may be configured to identify anomalous segments and sequences, relative to segments and sequences previously derived from the sequence of video frames and processed by the cluster and sequence layer. Additional details of the voting experts method are described in "Voting Experts: An Unsupervised Algorithm for Segmenting Sequences," by P. Cohen, et al., published in Intelligent Data Analysis, 2007.

FIG. 7 shows sequence labels 750 (which includes the labels of {D, B, C, F}) being supplied the sequence layer 710. In one embodiment, the sequences received by the sequence layer 710 may be stored in a pool and once a threshold number of trajectories are available (e.g., 100) the voting experts component 760 may generate (or update) the ngram trie 755, as well as determine the internal entropies and the boundary entropies for each traceable sequences in the ngram trie 755. Once trained, live sequences may be segmented as new ART labels are received (e.g., the sequence of ART labels 640 of FIG. 6).

In one embodiment, the frequency of occurrence for an observed sequence (e.g., the label sequence 750) may be determined from the ngram trie (which records the frequency of all observed sequences). As segments are induced in an emerging sequence, the voting experts component 760 may determine the probability of observing the sequence itself, as well as the probability of observing the particular segments induced in the sequence by the voting experts component 760. In the event that the probability of observing a given sequence (or segment) falls below a given threshold, an alert may be generated, when such a sequence (or segment) is, in fact, observed. Further, as noted above, the sequence layer may provide feedback to the clustering layer regarding the probability of observing different ART network labels in an emerging sequence. Thus, if after observing {D, B, C} the probability of then observing "F" is much greater than observing "E," then this information may be provided to the clustering layer and used to influence the mapping of an input data vector to a cluster in the ART network 725.

In this example, the voting experts 760 receives the label sequence 750 of {D, B, C, F} and, based on the votes of the internal entropy expert and the boundary entropy expert votes to create the segmented sequences 780. Specifically, a segment of (D, B) 785 and a segment of (C, F) 790 is generated. Note, as a pool of segments emerges from the sequencing layer 710, the segments themselves provide a pool of data for the next cluster layer. That is, the cluster layer following sequence layer 710 clusters the sequences generated by the cluster layer 710 (which are then sequenced and segmented by the next sequence layer, etc.).

However, as noted above, unlike the numerical data input to the first ventral and dorsal cluster layers of the cortex model component 240, the output of the sequencing layer is a symbolic symbol stream (i.e., the sequence of ART network labels segmented by the sequencing layer 710). In order to cluster the symbolic data, a formal language measure and a distance measure is used to train a self organizing map at higher layers of the cortex model component 240. In one embodiment, the formal language measure is given by:

$$\mu(L) = \Sigma_{i=1}^{\infty} w_i n_i(L),$$

where L is a formal language, $0 \leq \mu \leq 1$ is its measure, $n_i(L)$ is the number of strings of length i and, $w_i = (2k)^{-1}$, is the alphabet length. The formal language measure is used to derive a distance measure between any two formal languages where a distance measure d is given by:

$$d(L_1, L_2) \equiv \mu(L_1 \cup L_2 - L_1 \cap L_2),$$

the measure of the symmetric set difference between the two languages. In other words, it is the measure of the language containing the strings that are in $L_1$ or $L_2$ but not both. The distance of each sequence (a formal language with a single string) from a given sequence layer and each cluster at the next higher layer, can be calculated.

Using these equations, some, but not all of the vector algebra operations can be performed. Formal language vectors can be subtracted and absolute values can be taken, but multiplication by a scalar is not defined. This allows clustering by ART but not by SOM. The higher level cluster layers in this implementation of the invention use ART only for this reason. The symbolic data output by a given sequence layer in the cortex model component 240 may be clustered by the above ART network whose labels are passed to the next sequence layer.

Figure 8:
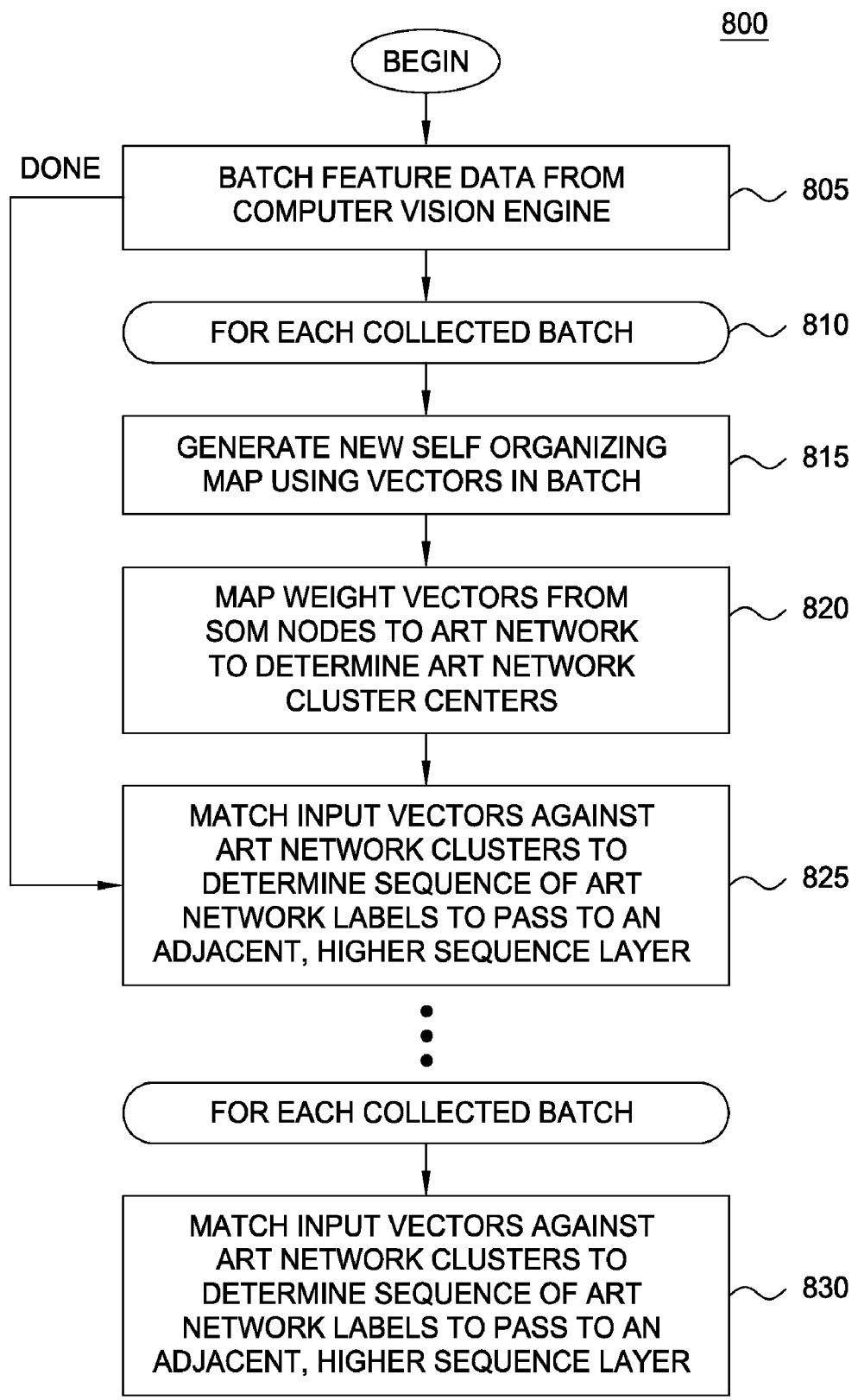
FIG. 8 illustrates a method for training a self-organizing map (SOM) and an adaptive resonance theory (ART) network in a cluster layer of the cortex model component of FIG. 2, according to one embodiment of the invention.

FIG. 8 illustrates a method 800 for training a self-organizing map (SOM) and an adaptive resonance theory (ART) network at both a first cluster layer and higher cluster layers of the cortex model component 240 of FIG. 2, according to one embodiment of the invention. As shown, the method 800 begins at step 805 where a cluster layer batches feature data from the computer vision engine (e.g., trajectories of micro feature vectors passed to the first dorsal cluster layer or trajectories of kinematic data passed to the first ventral cluster layer). At higher cluster layers of the cortex model component 240, batches of segments of sequences output from a sequence layer are clustered. Additionally, as noted, the output of sequence layers on the dorsal and ventral sides may be combined in the cortex model component 240. In such a case, at the cluster layer combining the dorsal and ventral sides, the input to the combining cluster layer may be the cross product of segments output from a dorsal side sequence layer and segments output from a ventral side sequence layer.

For each batch of input data from the computer vision engine 135, for the first cluster layer, steps 815, 820, and 825 are performed. At step 815, the input batch is used to train a self organizing map (SOM) using the vectors in a given training batch. At step 820, the resulting node weight vectors in the SOM are passed as input vector values to an adaptive resonance theory (ART) network, resulting in a set of ART network clusters. At step 825, the input vectors may be matched directly against the ART network (trained using the SOM node weight vectors) to determine a sequence of ART network labels to pass to an adjacent, higher sequence layer. Further, once done, as new input values are received based on subsequent observations and collected to from the next batch (step 805), the new input values are mapped to nodes in the ART network (step 825). For example, new kinematic data vectors or micro feature vectors in a trajectory of a foreground object may be passed to a first cluster layer. And in response the clusters which the new input values are mapped to are passed to the next sequence layer as a sequence of ART network labels.

For higher layers, new segments output from an adjacent, lower sequence layer are input to the next cluster layer. Such segments may be used to train an ART network at that cluster layer. Accordingly, at step 830 each vector of feature data collected from an adjacent, lower sequence layer is passed to an ART network. Thereafter, when new observations are available, i.e., new segments are received from an adjacent, lower, sequence layer, such input vectors are matched against clusters in an ART network at the given cluster layer to determine a sequence of ART network cluster labels to pass to an adjacent, higher, sequence layer.

Figure 9:
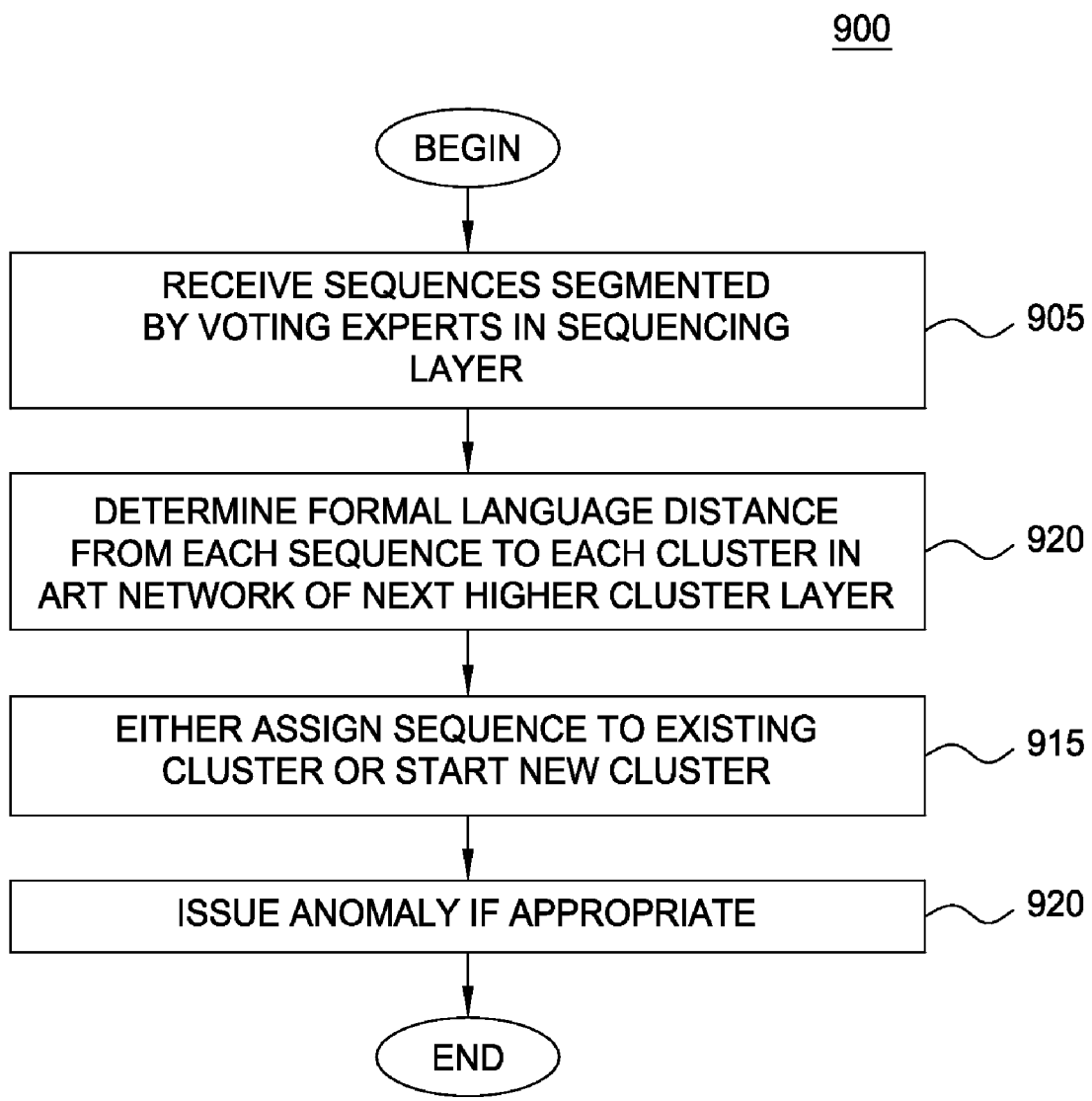
FIG. 9 illustrates a method for the cortex model component of FIG. 2 to model progressively more complex levels of behavior, according to one embodiment of the invention

FIG. 9 illustrates a method 900 for the cortex model component 240 of FIG. 2 to model progressively more complex levels of behavior, according to one embodiment of the invention. As shown, the method 900 begins at step 905 where a cluster layer receives a set of sequences segmented by voting experts in an adjacent, lower sequencing layer. In one embodiment, the cluster layer generates a formal language vector for each segment. In one embodiment, this may be done by using a finite portion of an infinite dimensional vector where each dimension represents one of the possible strings in the alphabet of a given formal language. If the string is actually in the language, then the component corresponding to the string is equal to 1, otherwise the component is equal to 0. The strings are ordered lexicographically. Once all the vector components past a given length are zero, the vector can be cut off. The measure ensures that even a language with an infinite number of strings will have a finite measure.

At step 910, the cluster layer determines a formal language distance for each sequence received at step 905 to each cluster in the ART network of that cluster layer, e.g., based on the formal language vector corresponding to a given segment and the equations set forth above. At step 915, the sequence may be added to an existing cluster or a new cluster may be started. That is, the input is mapped into the ART network. At step 920, depending on how the ART network maps a given sequence to the ART network at that cluster layer, an anomaly may be issued. Additionally, the cluster to which each respective vector is mapped to may be output as a sequence element passed to the adjacent, higher sequencing layer.

Figure 10:
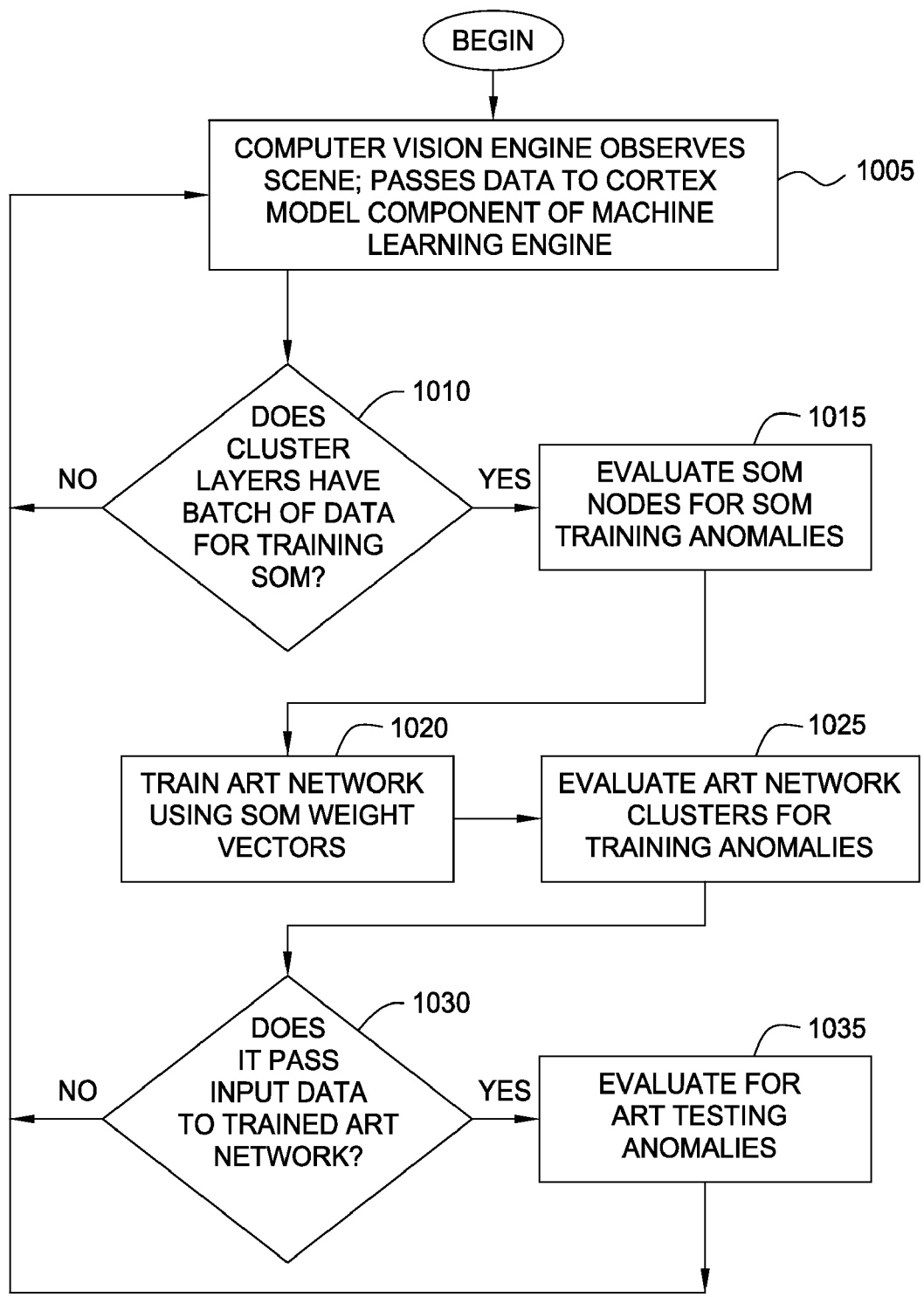
FIG. 10 illustrates a method for the cortex model component of FIG. 2 to identify occurrences of unusual behavior (anomalies) for progressively more complex levels of behavior based on prior observations of a scene, according to one embodiment of the invention.

FIG. 10 illustrates a method 1000 for the cortex model component 240 of FIG. 2 to identify occurrences of unusual behavior (anomalies) for progressively more complex levels of behavior based on prior observations of a scene, according to one embodiment of the invention. As shown, the method 1000 begins at step 1005 where the computer vision engine observes a scene and passes data to the cortex model component of a machine learning engine.

As described above, as data is pushed from the computer vision engine, a first dorsal cluster layer and a first ventral cluster layer begin clustering the kinematic and micro feature data. For example, the input data may be a kinematic data vector passed to a first ventral layer of the cortex model component 240 or a micro feature vector passed to a first dorsal cluster layer of the cortex model component 240. Such data may be batched and mapped into the nodes of a self organizing map (SOM) used to train an ART network, i.e., to develop a model of scene behavior. In turn, as new observations are mapped to the ART network, the resulting sequences of ART network labels are segmented by the first sequencing layer—producing pools of segments passed to the next cluster layer—and so on. That is, at higher layers of the cortex model component, the inputs to a cluster layer may be a segment induced by a voting experts component in a sequence of ART network labels.

In one embodiment, each cluster layer may be evaluated to identify a variety of different anomalous inputs. As progressively higher layers of the cortex model component represent progressively higher levels of abstraction, anomalies occurring in the higher levels of the cortex model represent observations of behavioral anomalies corresponding to progressively more complex patterns of behavior.

For example, at step 1010, the cortex model component 240 determines whether the initial cluster layer has batch of data for training a SOM. If so, at step 1015, such a batch of training data is mapped into the nodes of a SOM and the resulting nodes may be evaluated for SOM training anomalies. For example, a batch of feature based vectors output by the computer vision engine may be mapped to the input nodes of a SOM. In one embodiment the distance between every SOM input (e.g., each trajectory kinematics vector) and the best matching node in the SOM is identified. From this information a mean and standard deviation is determined. Any vector with a distance greater than two standard deviations (or other user specified distance) from the mean may be flagged as an anomaly. As noted, for the first dorsal layer and first ventral layer an N-dimensional Euclidean distance measure may be used.

Additionally, a "rare node" SOM training anomaly may also be identified. For example, the cortex model component may maintain a count of the number of inputs mapped to each SOM node and from this information determine the mean and standard deviation for distribution of input data and the nodes of a given SOM. In one embodiment, if the mean minus two standard deviations is equal to or greater than one, then the inputs in any node whose total number of inputs is equal to or less than this number may be flagged as an anomaly.

At step 1020, a set of node weight vectors may be clustered by an adaptive resonance theory (ART) network. And at step 1025, the cortex model component may evaluate the ART network clusters for training anomalies. For example, similar to the "rare node" SOM training anomaly, the cortex model component may maintain a count of the number of inputs assigned to a given ART network cluster and also determine a mean and standard deviation of inputs mapping to each such cluster. In one embodiment, if the mean minus two standard deviations is equal to or greater than one, then the inputs in any cluster whose total number of inputs is equal to or less than this number may be flagged as an anomaly.

Anomalies may also be identified using the trained ART network. For example, at step 1030 the cortex model component may determine that an input data vector is available for the ART network at a given cluster layer. Again, the input data may be a micro feature vector, a kinematics data vector, or a segment induced in a sequence of ART network labels. At step 1035, once such an input data is mapped to a cluster in a trained ART network, the cortex model component may evaluate which cluster the input data is mapped to, and in some cases identify an anomaly, e.g., if the input to a trained ART network does not match any cluster or when the input maps to a "rare" or "immature" cluster. For example, using the vigilance parameter, it is possible that an input will not match any existing ART cluster. In such a case, the input is flagged as an anomaly and a new node may be created in the ART network so that the corresponding input data can be passed to the next sequence layer in the cortex model. That is, when input data results in a new node in the ART network, a new cluster label is assigned, allowing the new cluster to be represented in sequences of ART network labels passed to the sequence layer for segmentation by the voting experts component at that sequence layer. Similarly, if the cluster to which the input data is mapped to has not been reinforced a specified minimum number of times (i.e., the cluster is "immature"), an alert specifying the occurrence of an anomalous observation may be generated Advantageously, as described, embodiments of the invention provide techniques for a video surveillance system to learn to recognize complex behaviors by analyzing pixel data using alternating layers of clustering and sequencing. One embodiment includes a video surveillance system configured to observe a scene (as depicted in a sequence of video frames) and, over time, develop hierarchies of concepts including classes of objects, actions and behaviors. That is, the video surveillance system may develop models at progressively more complex levels of abstraction used to identify what events and behaviors are common and which are unusual. When the models have matured, the video surveillance system issues alerts on unusual events. This may occur automatically, without user input and using any sensors that can track and classify objects.

While the foregoing is directed to embodiments of the present invention, other and further embodiments of the invention may be devised without departing from the basic scope thereof, and the scope thereof is determined by the claims that follow.

What is claimed is:

1. A computer-implemented method for analyzing a sequence of video frames depicting a scene captured by a video camera, the method comprising:
    receiving a set of data inputs derived by a computer vision engine configured to analyze pixels depicting a plurality of foreground objects in the sequence of video frames;
    modeling behavior of the foreground objects in the scene by passing the received sensory data inputs to a first cluster layer of a plurality of layers, wherein the plurality of layers alternate between cluster layers and sequence layers and wherein the cluster layers generate clusters of sequences and the sequence layers generate sequences of clusters and wherein each cluster layer generates clusters using a self organizing map (SOM) and an adaptive resonance theory (ART) network;
    evaluating one or more of the cluster layers to identify an occurrence of a behavioral anomaly based on an input to one of the cluster layers; and
    publishing an alert message indicating the occurrence of the behavioral anomaly.

2. The method of claim 1, further comprising:
    batching, at a given one of the plurality of cluster layers, a set of elements of input data used to train the SOM; and
    training the SOM using the batched input data, wherein evaluating the cluster layers to identify the occurrence of the behavioral anomaly in the given cluster layer comprises:
        identifying a matching node in the SOM for each element of batched input data;
        determining a mean and standard deviation for a distance between each element of input data and the matched node of the SOM, and
        upon determining a first one of the elements of input data is matched to a node in the SOM at a distance greater than two standard deviations from the mean, flagging the first element of input data as being indicative of the occurrence of the behavioral anomaly in the given cluster layer.

3. The method of claim 1, further comprising:
    batching, at a given one of the plurality of cluster layers, a set of node weight vectors associated with nodes of the SOM;
    training the ART network using the batched node weight vectors, wherein evaluating the cluster layers to identify the occurrence of the behavioral anomaly in the given cluster layer comprises:
        identifying a matching cluster in ART network for each node weight vector used to train the ART network;
        determining a mean and standard deviation for a distance between each node weight vector and the matched cluster of the ART network, and
        upon determining a first one node weight vectors is matched to a cluster in the ART network at a distance greater than two standard deviations from the mean, flagging the node weight vector as being indicative of the occurrence of the behavioral anomaly in the given cluster layer.

4. The method of claim 1, wherein evaluating one or more of the cluster layers to identify an occurrence of a behavioral anomaly in one of the cluster layers comprises one of (i) determining that the ART network generated a new cluster to model a received set of input data mapped to clusters in the ART network; and (ii) determining that the ART network mapped a received set of input data to a cluster in the ART network that has not been reinforced with a threshold number of inputs.

5. The method of claim 1, wherein cluster layers subsequent to the first cluster layer generate clusters from sequences generated by a previous sequence layer and wherein the sequence layers generate sequences of clusters generated by a previous cluster layer.

6. The method of claim 1, wherein the first cluster layer includes a dorsal side cluster layer and a ventral side cluster layer, and wherein the set of data inputs passed to the ventral side cluster layer includes a plurality of numerical kinematic data vectors characterizing a set of kinematics of the foreground objects in the scene and wherein the dorsal side cluster layer includes a plurality of numerical feature data vectors characterizing a set of micro features of the foreground objects.

7. The method of claim 6, wherein the dorsal side cluster layer outputs a symbolic symbol stream passed to a first dorsal side sequence layer and wherein the ventral side cluster layer outputs a second symbolic symbol stream passed to a first ventral side sequence layer.

8. The method of claim 6, wherein the first dorsal side sequence layer and the first ventral side sequence layer each include a voting experts component configured to induce one or more segments in the symbolic symbol stream passed to the respective first dorsal side sequence layer and the first ventral side sequence layer.

9. A computer-readable storage medium containing a program which, when executed by a processor, performs an operation for analyzing a sequence of video frames depicting a scene captured by a video camera, the operation comprising:
    receiving a set of data inputs derived by a computer vision engine configured to analyze pixels depicting a plurality of foreground objects in the sequence of video frames;
    modeling behavior of the foreground objects in the scene by passing the received sensory data inputs to a first cluster layer of a plurality of layers, wherein the plurality of layers alternate between cluster layers and sequence layers and wherein the cluster layers generate clusters of sequences and the sequence layers generate sequences of clusters and wherein each cluster layer generates clusters using a self organizing map (SOM) and an adaptive resonance theory (ART) network;

evaluating one or more of the cluster layers to identify an occurrence of a behavioral anomaly based on an input to one of the cluster layers; and publishing an alert message indicating the occurrence of the behavioral anomaly.

10. The computer-readable storage medium of claim 9, wherein the operation further comprises:

batching, at a given one of the plurality of cluster layers, a set of elements of input data used to train the SOM; and training the SOM using the batched input data, wherein evaluating the cluster layers to identify the occurrence of the behavioral anomaly in the given cluster layer comprises:

identifying a matching node in the SOM for each element of batched input data;

determining a mean and standard deviation for a distance between each element of input data and the matched node of the SOM, and upon determining a first one of the elements of input data is matched to a node in the SOM at a distance greater than two standard deviations from the mean, flagging the first element of input data as being indicative of the occurrence of the behavioral anomaly in the given cluster layer.

11. The computer-readable storage medium of claim 9, wherein the operation further comprises:

batching, at a given one of the plurality of cluster layers, a set of node weight vectors associated with nodes of the SOM;

training the ART network using the batched node weight vectors, wherein evaluating the cluster layers to identify the occurrence of the behavioral anomaly in the given cluster layer comprises:

identifying a matching cluster in ART network for each node weight vector used to train the ART network;

determining a mean and standard deviation for a distance between each node weight vector and the matched cluster of the ART network, and upon determining a first one node weight vectors is matched to a cluster in the ART network at a distance greater than two standard deviations from the mean, flagging the node weight vector as being indicative of the occurrence of the behavioral anomaly in the given cluster layer.

12. The computer-readable storage medium of claim 9, wherein evaluating one or more of the cluster layers to identify an occurrence of a behavioral anomaly in one of the cluster layers comprises one of (i) determining that the ART network generated a new cluster to model a received set of input data mapped to clusters in the ART network; and (ii) determining that the ART network mapped a received set of input data to a cluster in the ART network that has not been reinforced with a threshold number of inputs.

13. The computer-readable storage medium of claim 9, wherein cluster layers subsequent to the first cluster layer generate clusters from sequences generated by a previous sequence layer and wherein the sequence layers generate sequences of clusters generated by a previous cluster layer.

14. The computer-readable storage medium of claim 9, wherein the first cluster layer includes a dorsal side cluster layer and a ventral side cluster layer, and wherein the set of data inputs passed to the ventral side cluster layer includes a plurality of numerical kinematic data vectors characterizing a set of kinematics of the foreground objects in the scene and wherein the dorsal side cluster layer includes a plurality of numerical feature data vectors characterizing a set of micro features of the foreground objects.

15. The computer-readable storage medium of claim 14, wherein the dorsal side cluster layer outputs a symbolic symbol stream passed to a first dorsal side sequence layer and wherein the ventral side cluster layer outputs a second symbolic symbol stream passed to a first ventral side sequence layer.

16. The computer-readable storage medium of claim 14, wherein the first dorsal side sequence layer and the first ventral side sequence layer each include a voting experts component configured to induce one or more segments in the symbolic symbol stream passed to the respective first dorsal side sequence layer and the first ventral side sequence layer.

17. A system, comprising:

a video input source configured to provide a sequence of video frames, each depicting a scene;

a processor; and a memory containing a program, which, when executed on the processor is configured to perform an operation for analyzing the scene, as depicted by the sequence of video frames captured by the video input source, the operation comprising:

receiving a set of data inputs derived by a computer vision engine configured to analyze pixels depicting a plurality of foreground objects in the sequence of video frames, modeling behavior of the foreground objects in the scene by passing the received sensory data inputs to a first cluster layer of a plurality of layers, wherein the plurality of layers alternate between cluster layers and sequence layers and wherein the cluster layers generate clusters of sequences and the sequence layers generate sequences of clusters and wherein each cluster layer generates clusters using a self organizing map (SOM) and an adaptive resonance theory (ART) network, evaluating one or more of the cluster layers to identify an occurrence of a behavioral anomaly based on an input to one of the cluster layers, and publishing an alert message indicating the occurrence of the behavioral anomaly.

18. The system of claim 17, wherein the operation further comprises:

batching, at a given one of the plurality of cluster layers, a set of elements of input data used to train the SOM; and training the SOM using the batched input data, wherein evaluating the cluster layers to identify the occurrence of the behavioral anomaly in the given cluster layer comprises:

identifying a matching node in the SOM for each element of batched input data;

determining a mean and standard deviation for a distance between each element of input data and the matched node of the SOM, and upon determining a first one of the elements of input data is matched to a node in the SOM at a distance greater than two standard deviations from the mean, flagging the first element of input data as being indicative of the occurrence of the behavioral anomaly in the given cluster layer.

19. The system of claim 18, wherein the operation further comprises:

batching, at a given one of the plurality of cluster layers, a set of node weight vectors associated with nodes of the SOM;

training the ART network using the batched node weight vectors, wherein evaluating the cluster layers to identify the occurrence of the behavioral anomaly in the given cluster layer comprises:

identifying a matching cluster in ART network for each node weight vector used to train the ART network;

determining a mean and standard deviation for a distance between each node weight vector and the matched cluster of the ART network, and upon determining a first one node weight vectors is matched to a cluster in the ART network at a distance greater than two standard deviations from the mean, flagging the node weight vector as being indicative of the occurrence of the behavioral anomaly in the given cluster layer.

20. The system of claim 18, wherein evaluating one or more of the cluster layers to identify an occurrence of a behavioral anomaly in one of the cluster layers comprises one of (i) determining that the ART network generated a new cluster to model a received set of input data mapped to clusters in the ART network; and (ii) determining that the ART network mapped a received set of input data to a cluster in the ART network that has not been reinforced with a threshold number of inputs.

21. The system of claim 18, wherein cluster layers subsequent to the first cluster layer generate clusters from sequences generated by a previous sequence layer and wherein the sequence layers generate sequences of clusters generated by a previous cluster layer.

22. The system of claim 18, wherein the first cluster layer includes a dorsal side cluster layer and a ventral side cluster layer, and wherein the set of data inputs passed to the ventral side cluster layer includes a plurality of numerical kinematic data vectors characterizing a set of kinematics of the foreground objects in the scene and wherein the dorsal side cluster layer includes a plurality of numerical feature data vectors characterizing a set of micro features of the foreground objects.

23. The system of claim 22, wherein the dorsal side cluster layer outputs a symbolic symbol stream passed to a first dorsal side sequence layer and wherein the ventral side cluster layer outputs a second symbolic symbol stream passed to a first ventral side sequence layer.

24. The system of claim 22, wherein the first dorsal side sequence layer and the first ventral side sequence layer each include a voting experts component configured to induce one or more segments in the symbolic symbol stream passed to the respective first dorsal side sequence layer and the first ventral side sequence layer.

* * * * *